United States Patent
Henderson et al.

(10) Patent No.: US 12,442,902 B2
(45) Date of Patent: Oct. 14, 2025

(54) PIPELINED HISTOGRAM PIXEL

(71) Applicant: Sense Photonics, Inc., Durham, NC (US)

(72) Inventors: Robert Henderson, Edinburgh (GB); Tarek Al Abbas, Edinburgh (GB); David Storrar, Falkirk (GB)

(73) Assignee: Sense Photonics, Inc., Durham, NC (US)

( * ) Notice: Subject to any disclaimer, the term of this patent is extended or adjusted under 35 U.S.C. 154(b) by 1317 days.

(21) Appl. No.: 17/143,570

(22) Filed: Jan. 7, 2021

(65) Prior Publication Data

US 2021/0215807 A1     Jul. 15, 2021

Related U.S. Application Data

(60) Provisional application No. 62/958,894, filed on Jan. 9, 2020.

(51) Int. Cl.
| | |
|---|---|
| *G01S 7/4865* | (2020.01) |
| *G01S 7/481* | (2006.01) |
| *G01S 17/894* | (2020.01) |
| *G01S 17/931* | (2020.01) |

(52) U.S. Cl.
CPC .......... *G01S 7/4865* (2013.01); *G01S 7/4815* (2013.01); *G01S 7/4816* (2013.01); *G01S 17/894* (2020.01); *G01S 17/931* (2020.01)

(58) Field of Classification Search
None
See application file for complete search history.

(56) References Cited

U.S. PATENT DOCUMENTS

| | | |
|---|---|---|
| 10,914,824 B2 | 2/2021 | Meng et al. |
| 2012/0075615 A1 | 3/2012 | Niclass et al. |
| 2013/0088620 A1* | 4/2013 | Centen ............ H04N 23/12 |
| | | 348/308 |

(Continued)

FOREIGN PATENT DOCUMENTS

| | | |
|---|---|---|
| CN | 109814117 A | 5/2019 |
| EP | 3460508 A1 | 3/2019 |

OTHER PUBLICATIONS

Extended European Search Report corresponding to European Patent Application No. 21738192.0 (12 pages) (dated Oct. 30, 2023).

(Continued)

*Primary Examiner* — Isam A Alsomiri
*Assistant Examiner* — Sanjida Naser
(74) *Attorney, Agent, or Firm* — Kilpatrick Townsend & Stockton LLP

(57) ABSTRACT

A Light Detection and Ranging (LIDAR) detector circuit includes a memory device comprising a first memory and a second memory, and at least one control circuit. The at least one control circuit is configured to execute first memory storage operations to store data indicated by detection signals received from one or more photodetector elements in the first memory during a first portion of a time between pulses of an emitter signal output from a LIDAR emitter element, and to execute second memory storage operations to include the data, which was stored in the first memory, in the second memory during a second portion of the time between the pulses of the emitter signal. Related devices and methods of operation are also discussed.

20 Claims, 18 Drawing Sheets

(56) References Cited

U.S. PATENT DOCUMENTS

| | | |
|---|---|---|
| 2014/0253758 A1 | 9/2014 | Metz |
| 2015/0145518 A1* | 5/2015 | Haldner ................. G01V 3/165 |
| | | 324/329 |
| 2017/0052065 A1 | 2/2017 | Sharma et al. |
| 2018/0164415 A1 | 6/2018 | Buckley et al. |
| 2018/0209846 A1 | 7/2018 | Mandai et al. |
| 2018/0301872 A1 | 10/2018 | Burroughs et al. |
| 2019/0250257 A1 | 8/2019 | Finkelstein et al. |
| 2020/0135776 A1 | 4/2020 | Finkelstein |
| 2020/0225333 A1* | 7/2020 | Birnbacher ............. G01S 17/08 |

OTHER PUBLICATIONS

Niclass et al. "A 0.18μm CMOS SoC for a 100m-range 10fps 200×96-pixel time-of-flight depth sensor" IEEE Journal of Solid-State Circuits, 49(1):315-330 (2014).

Notification of Transmittal of the International Search Report and the Written Opinion of the International Searching Authority, or the Declaration, in corresponding PCT Application No. PCT/US2021/012458 (Apr. 29, 2021).

U.S. Appl. No. 62/966,171 entitled "DRAM-Based LIDAR Pixel" filed Jan. 27, 2020.

CN202180008472.X , "Office Action", May 30, 2025, 19 pages.

EP21738192.0 , "Intention to Grant", May 21, 2025, 8 pages.

\* cited by examiner

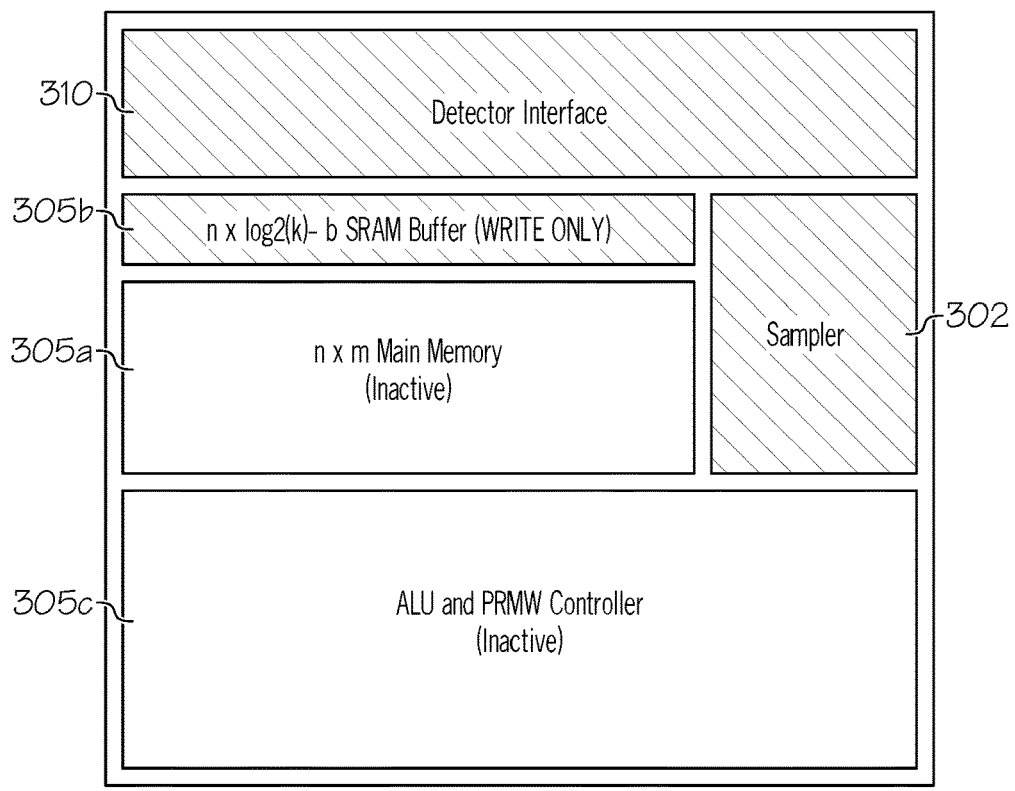
FIG. 4A1
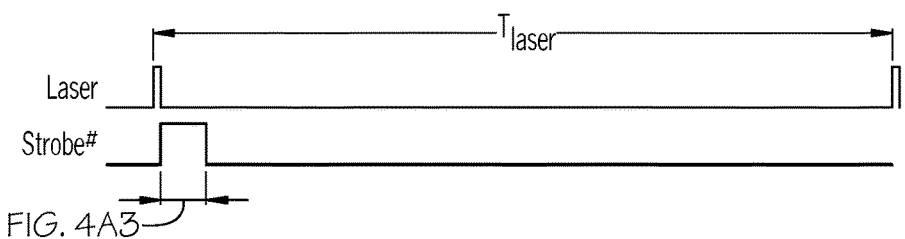
FIG. 4A2
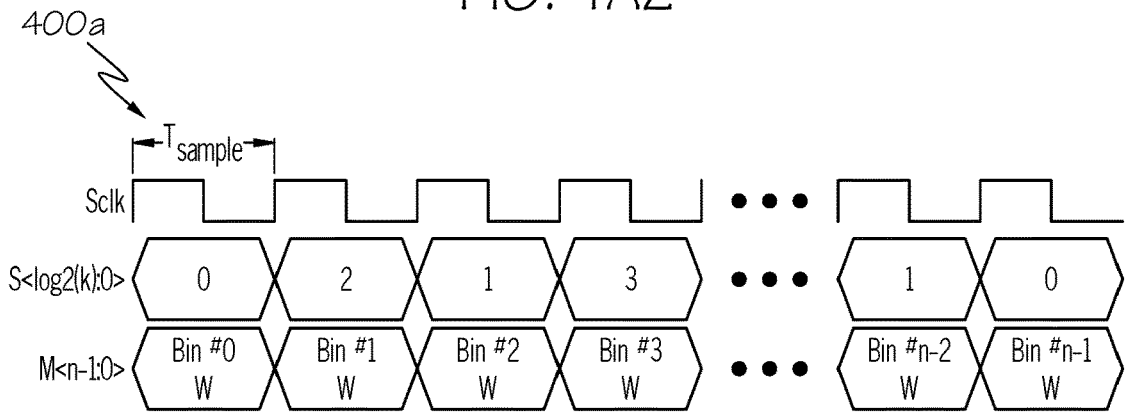
FIG. 4A3

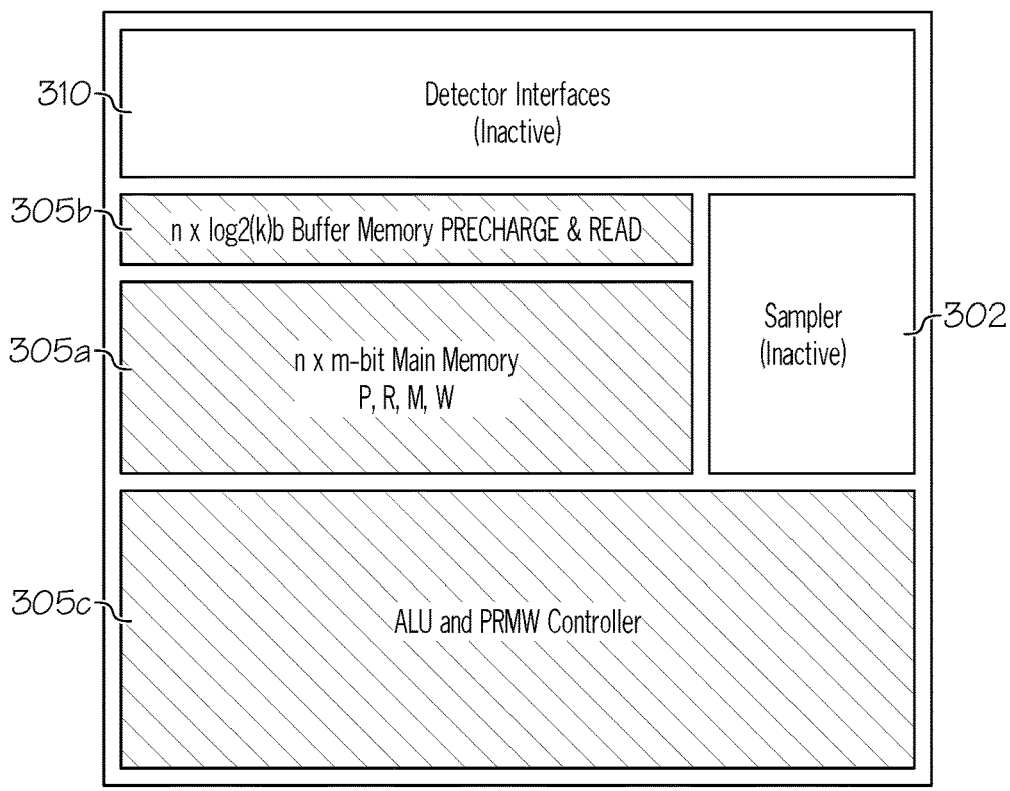
FIG. 4B1
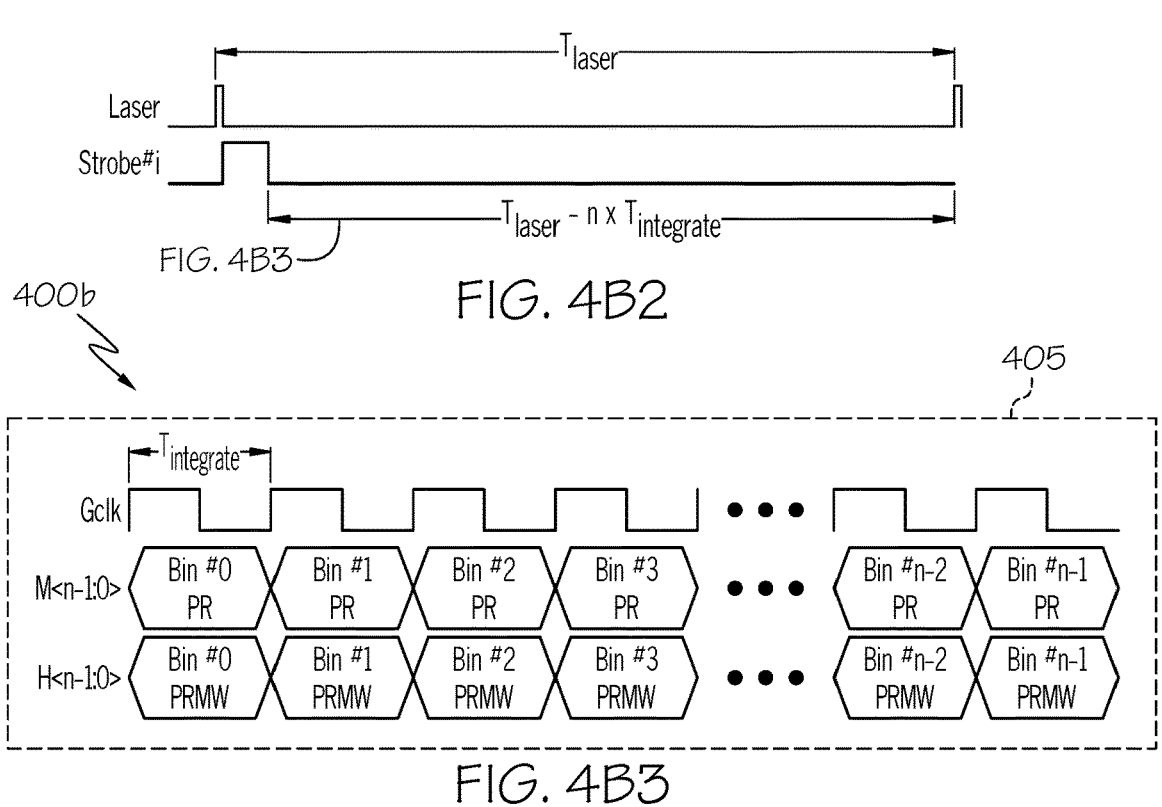
FIG. 4B2
FIG. 4B3

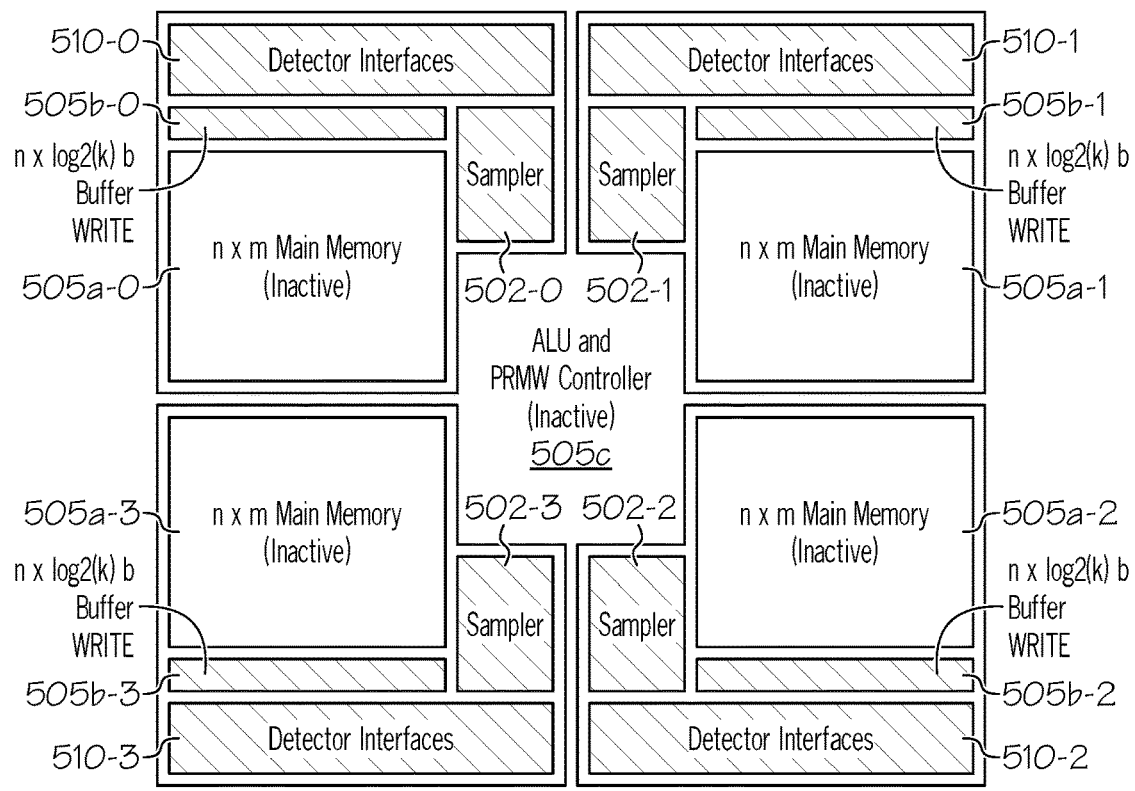
FIG. 5A1
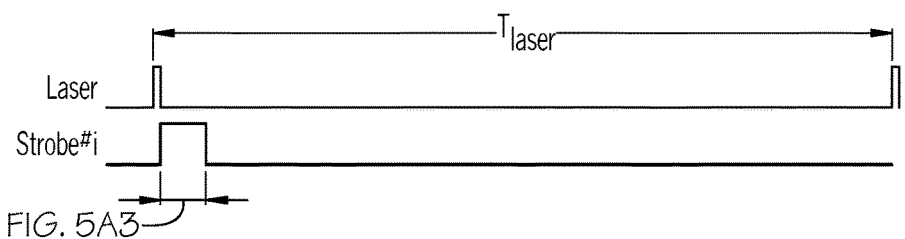
FIG. 5A2
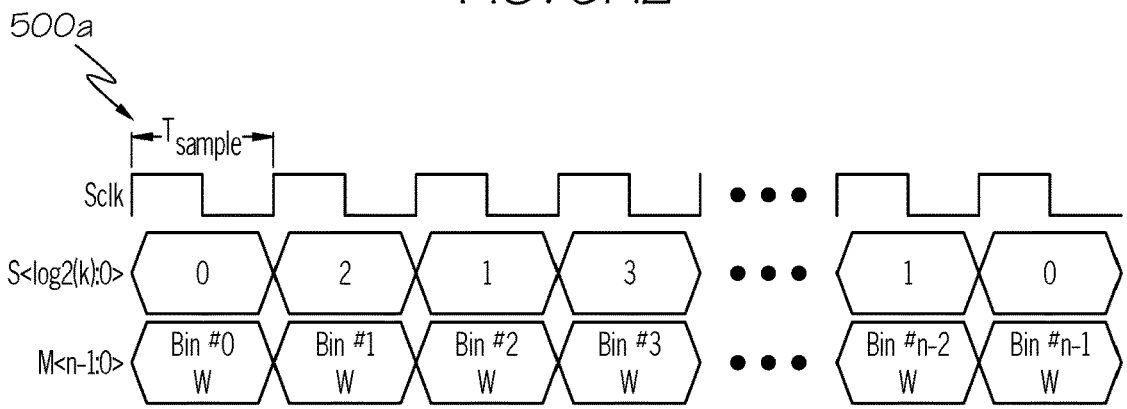
FIG. 5A3

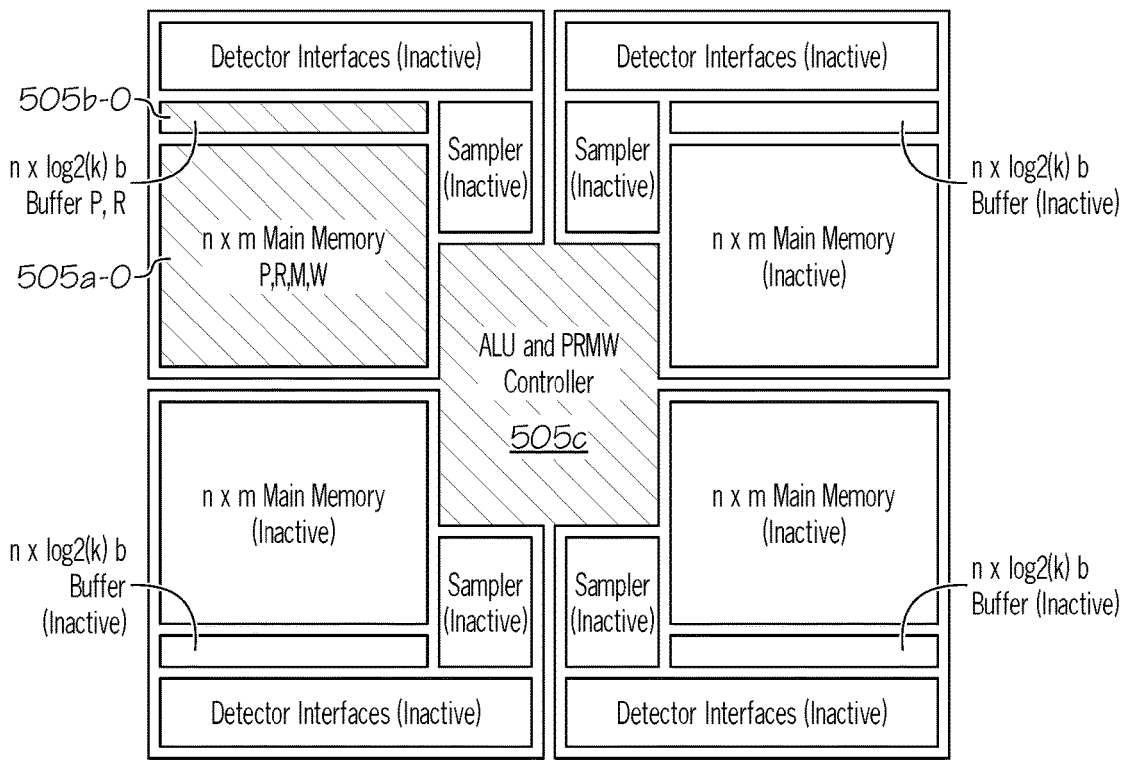
FIG. 5B1
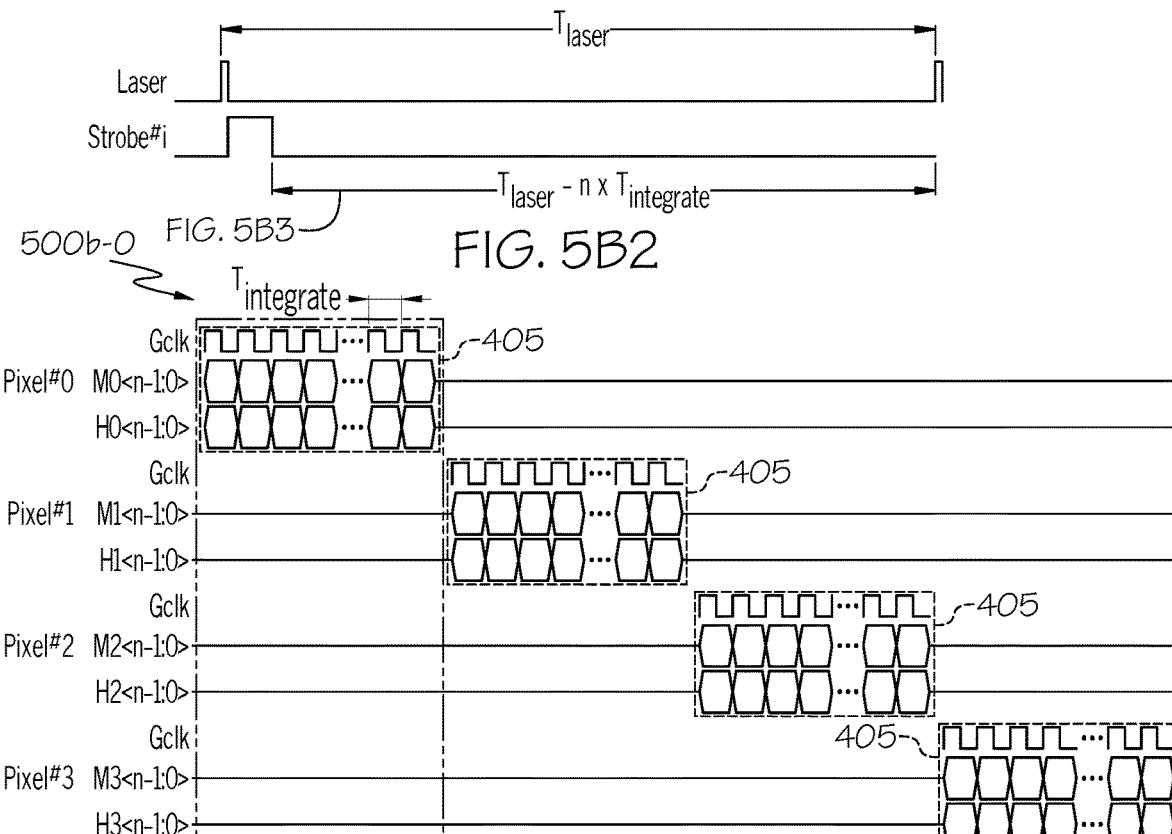
FIG. 5B2
FIG. 5B3

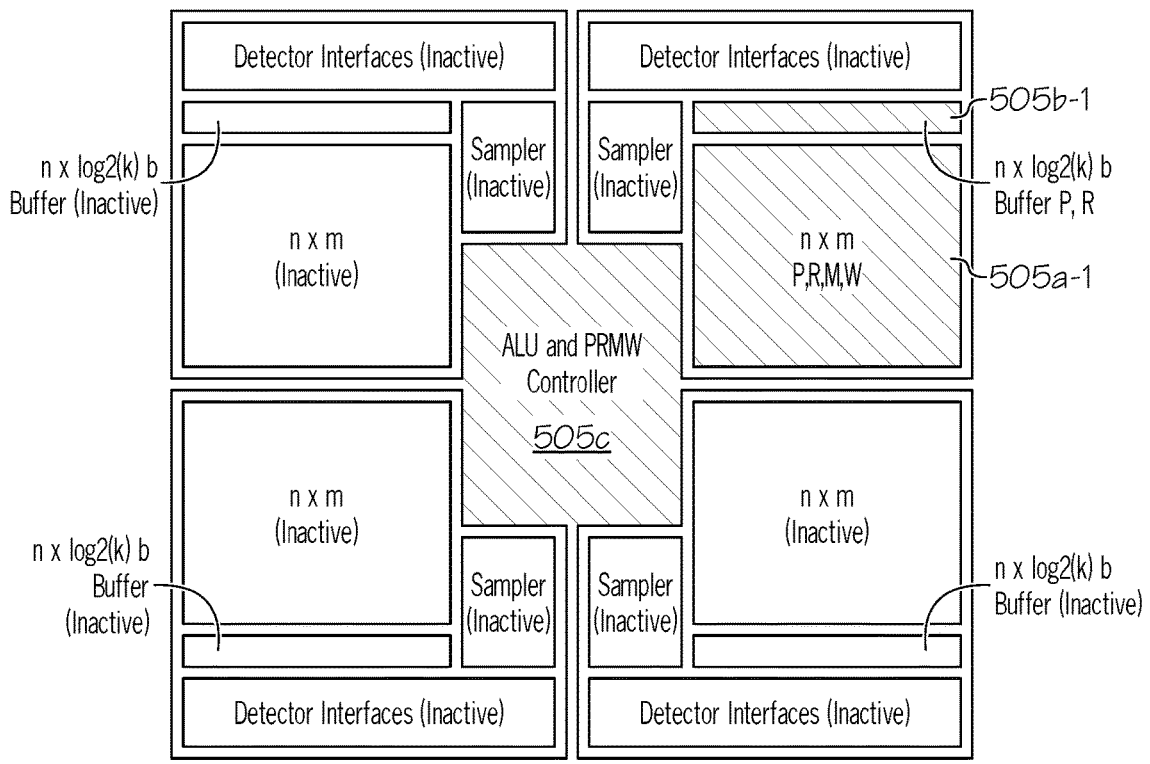
FIG. 5C1
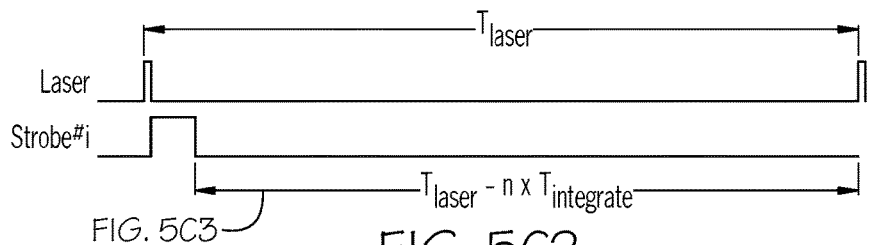
FIG. 5C2
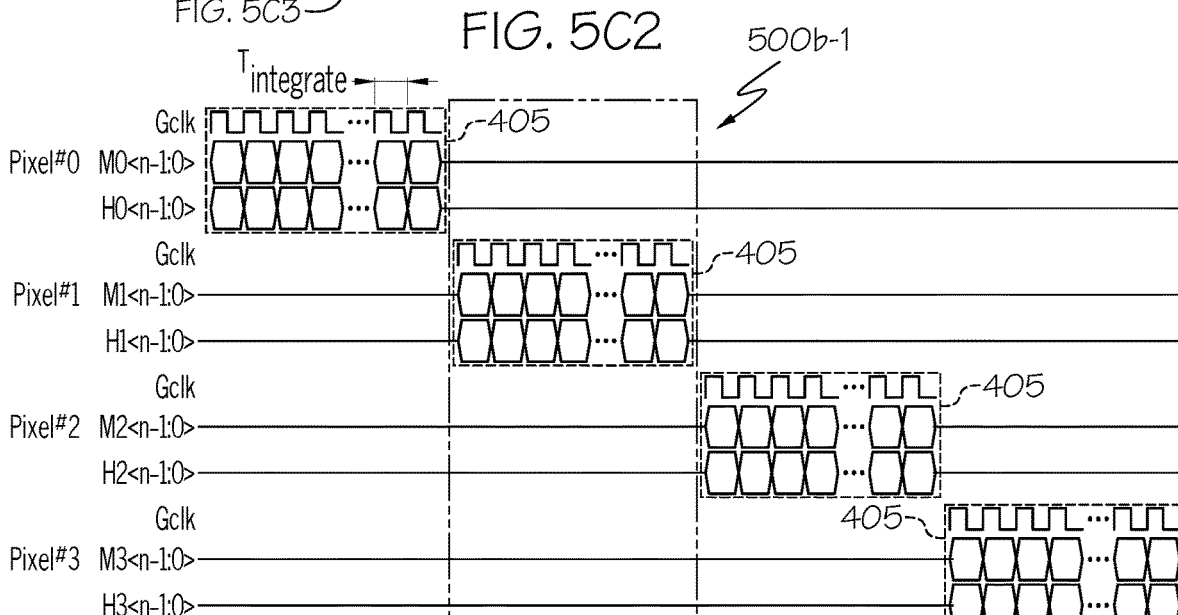
FIG. 5C3

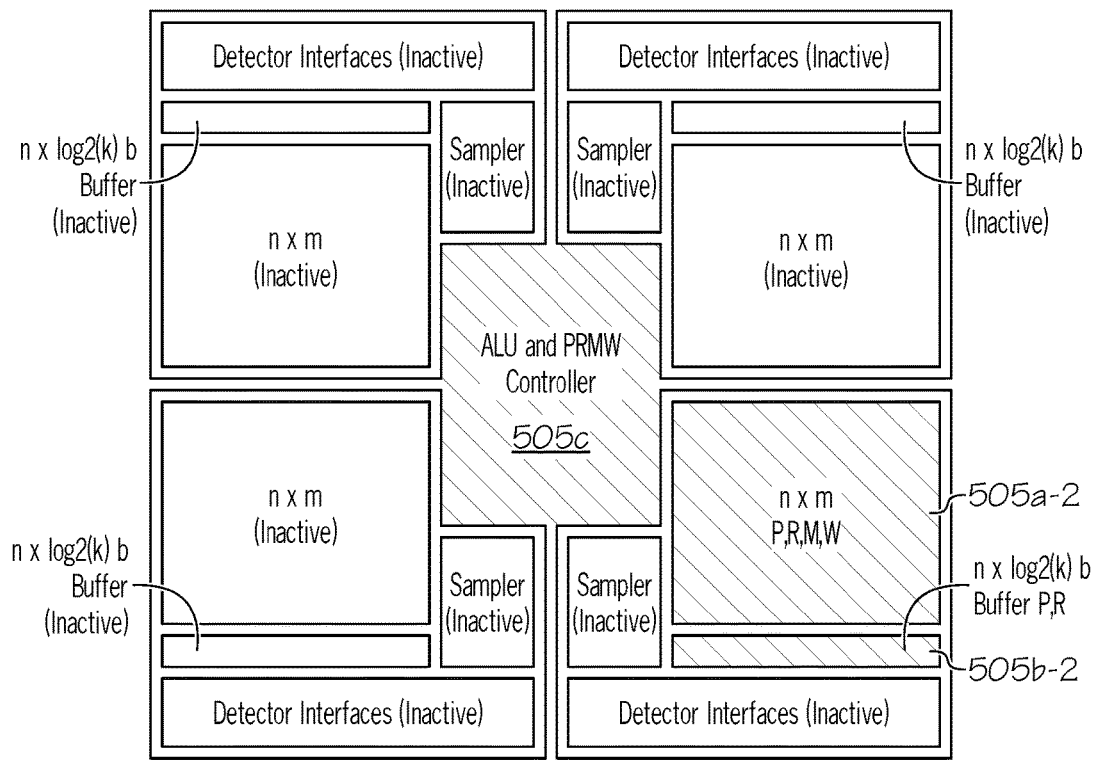
FIG. 5D1
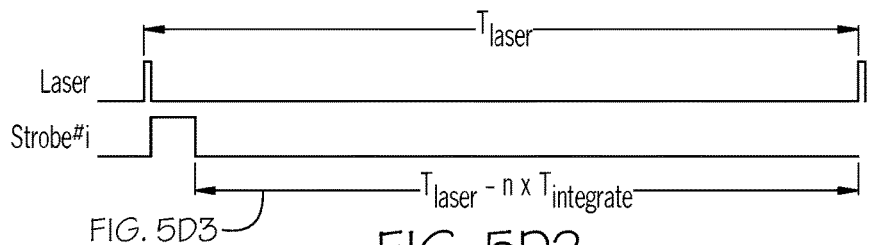
FIG. 5D2
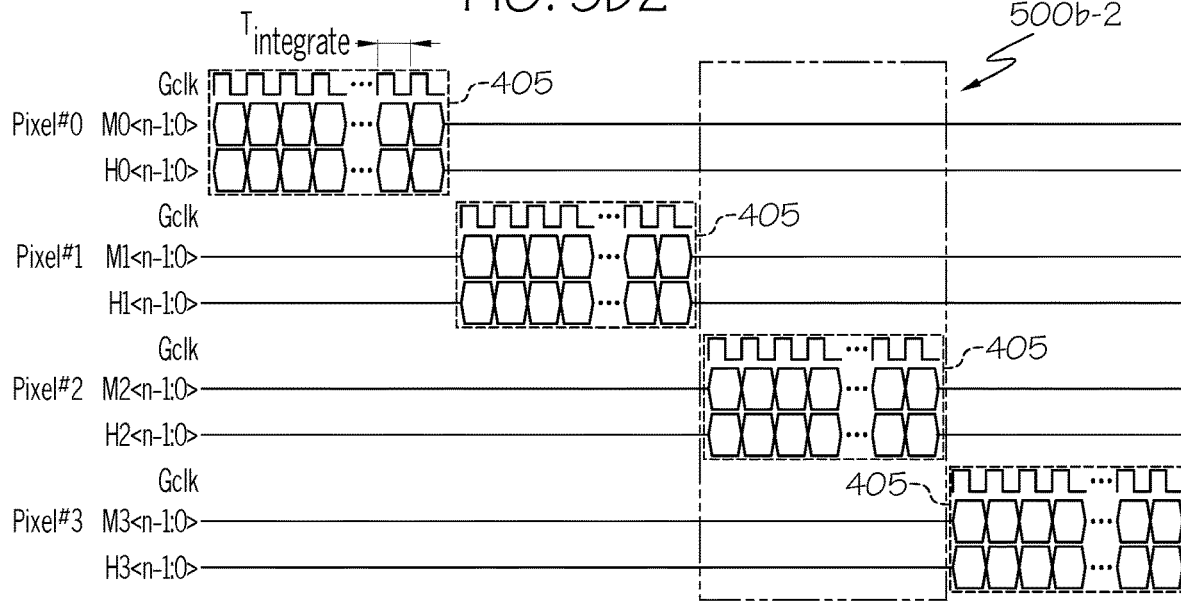
FIG. 5D3

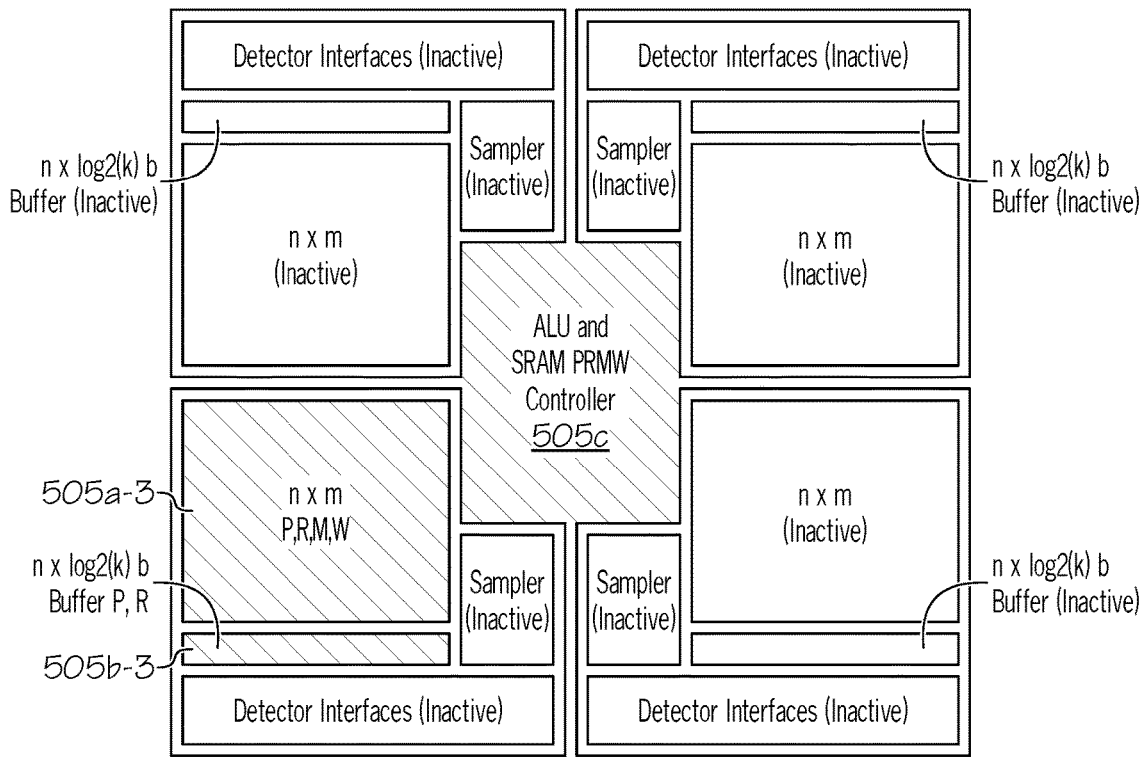
FIG. 5E1
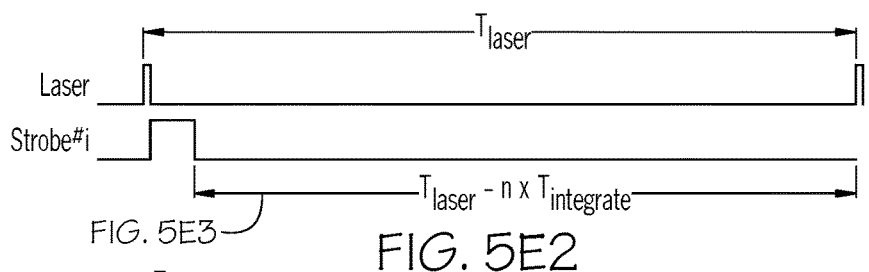
FIG. 5E2
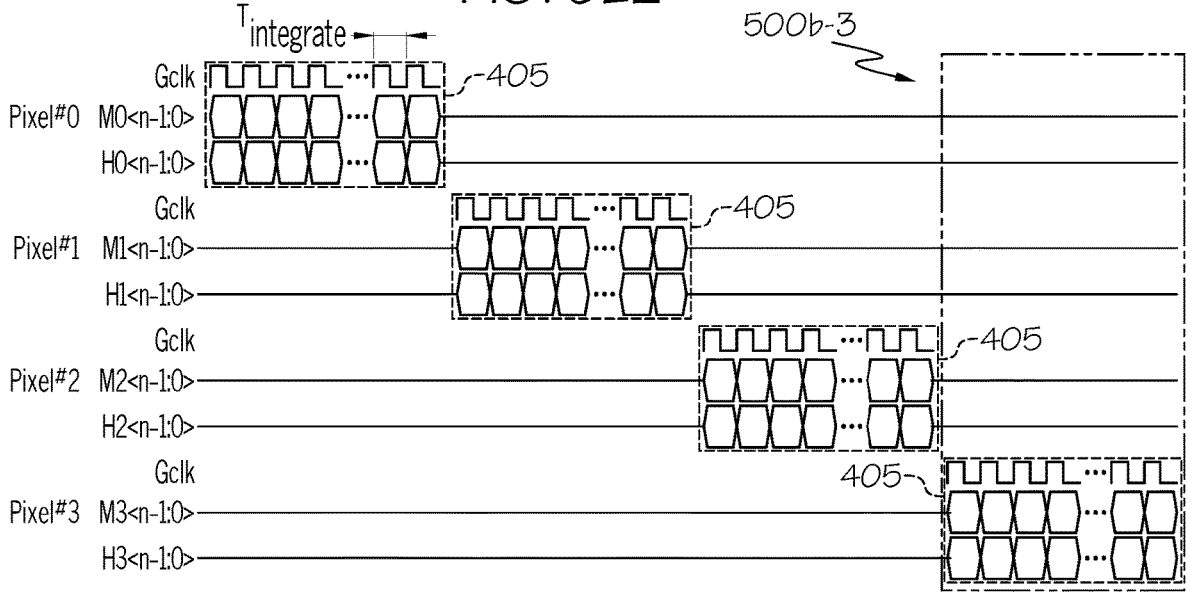
FIG. 5E3

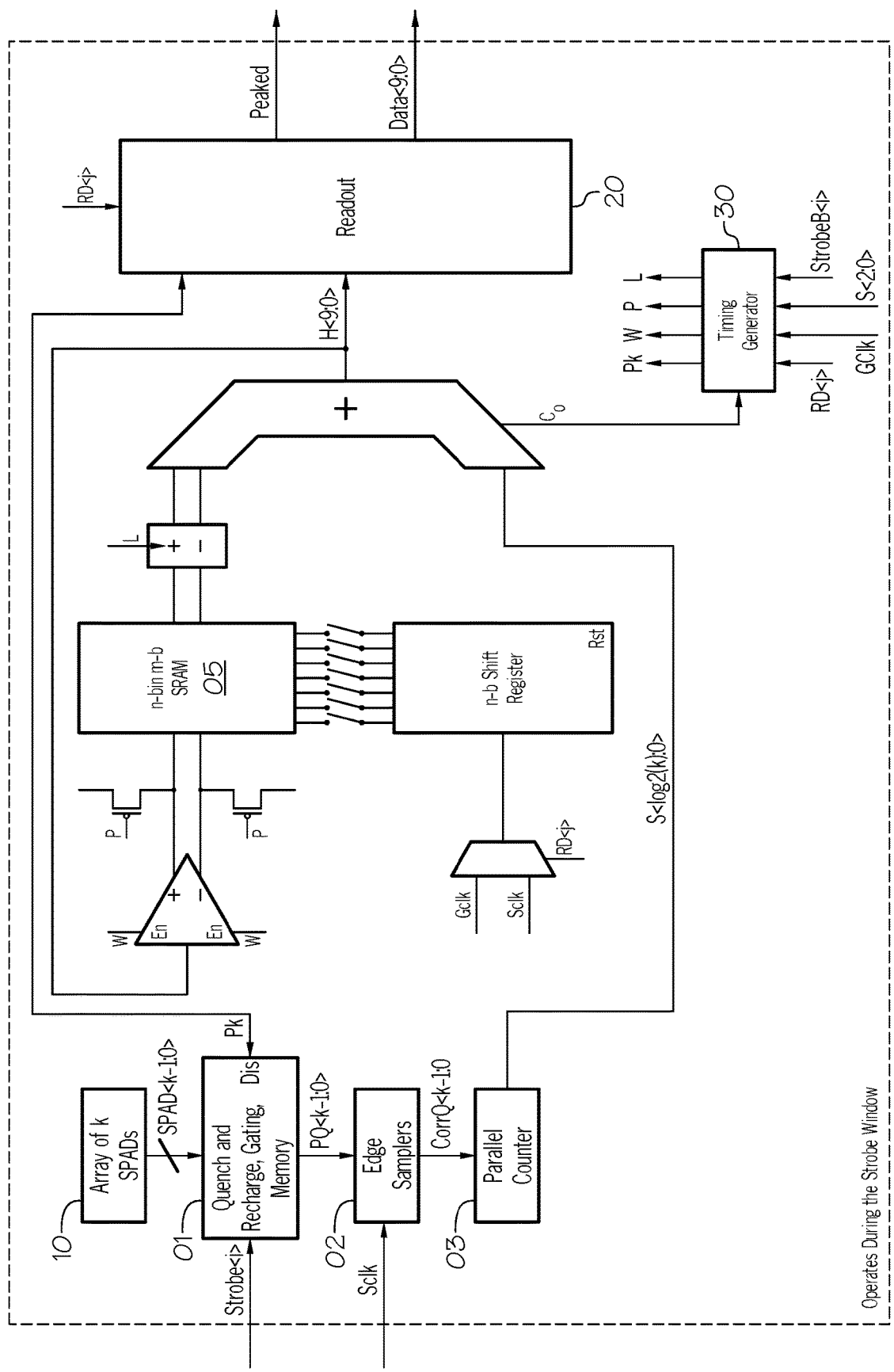
FIG. 6B1
Operates During the Strobe Window

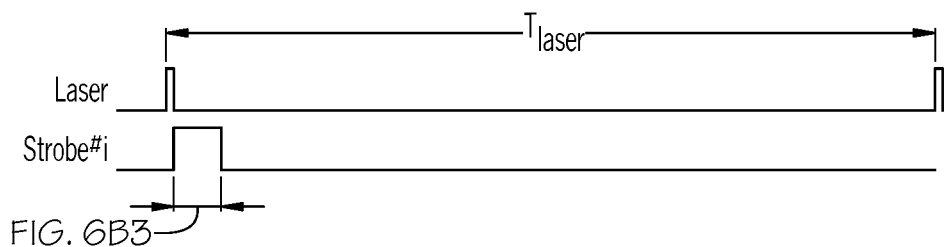
FIG. 6B2
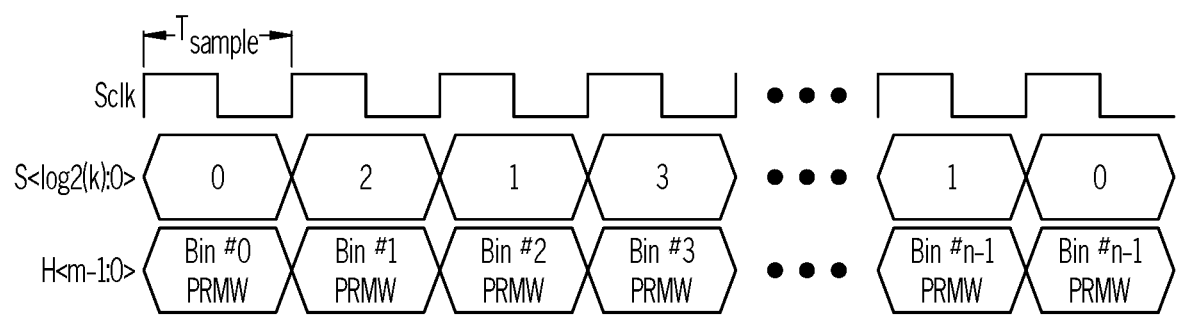
FIG. 6B3

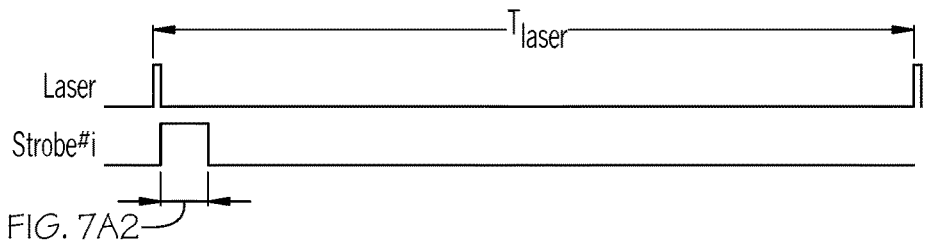
FIG. 7A1
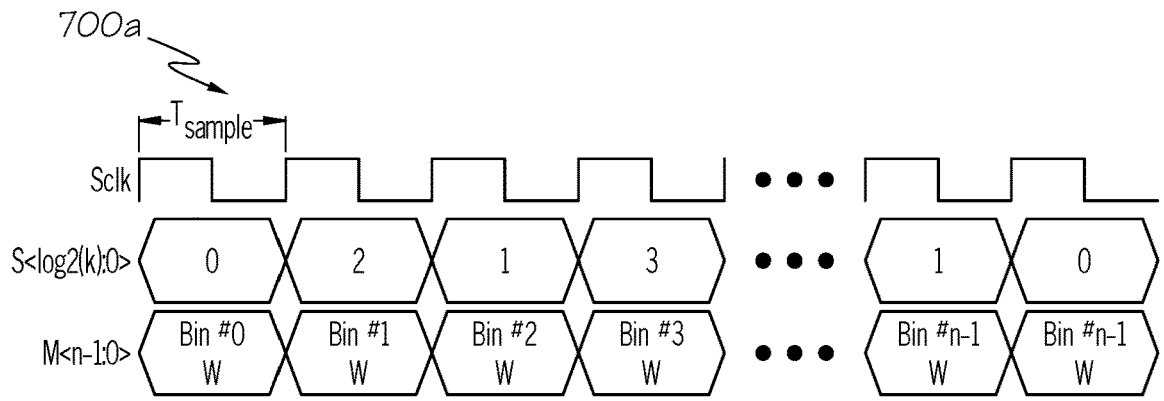
FIG. 7A2
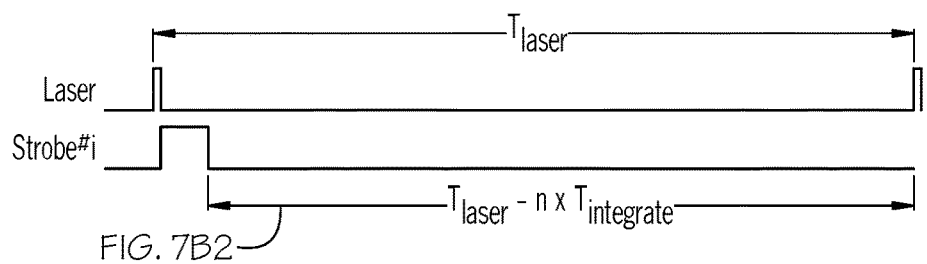
FIG. 7B1
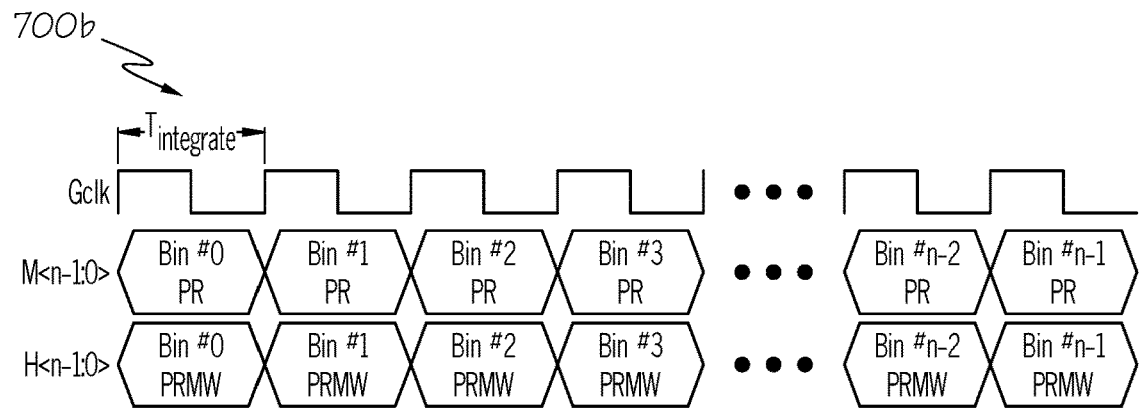
FIG. 7B2

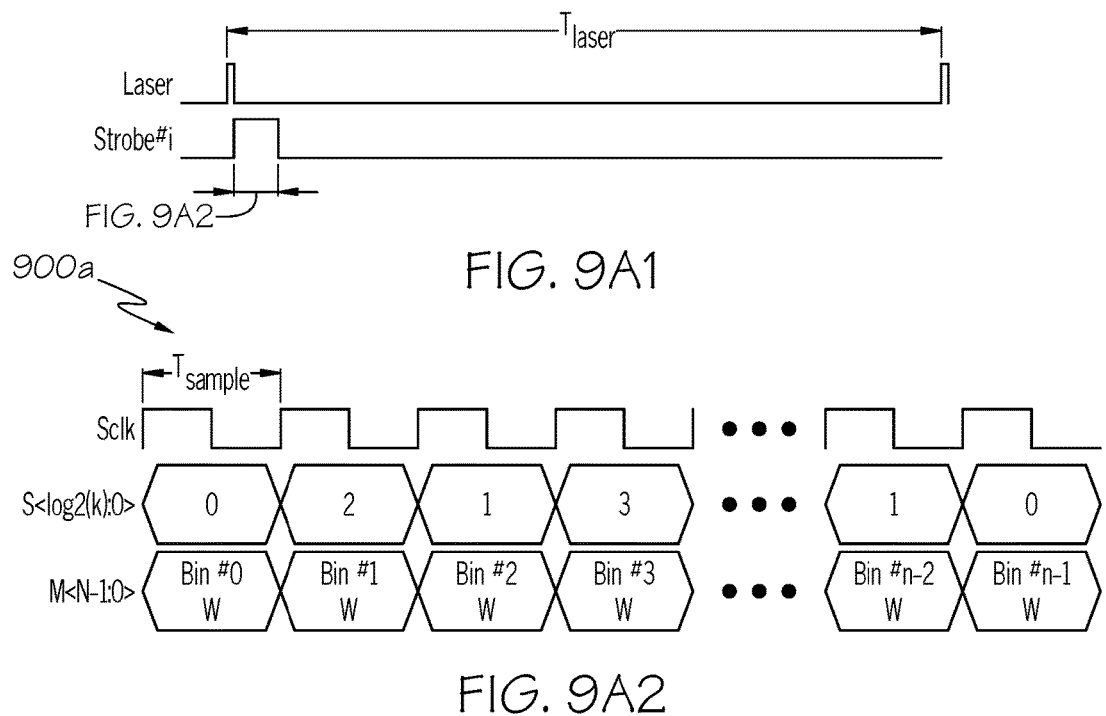
FIG. 9A1
FIG. 9A2
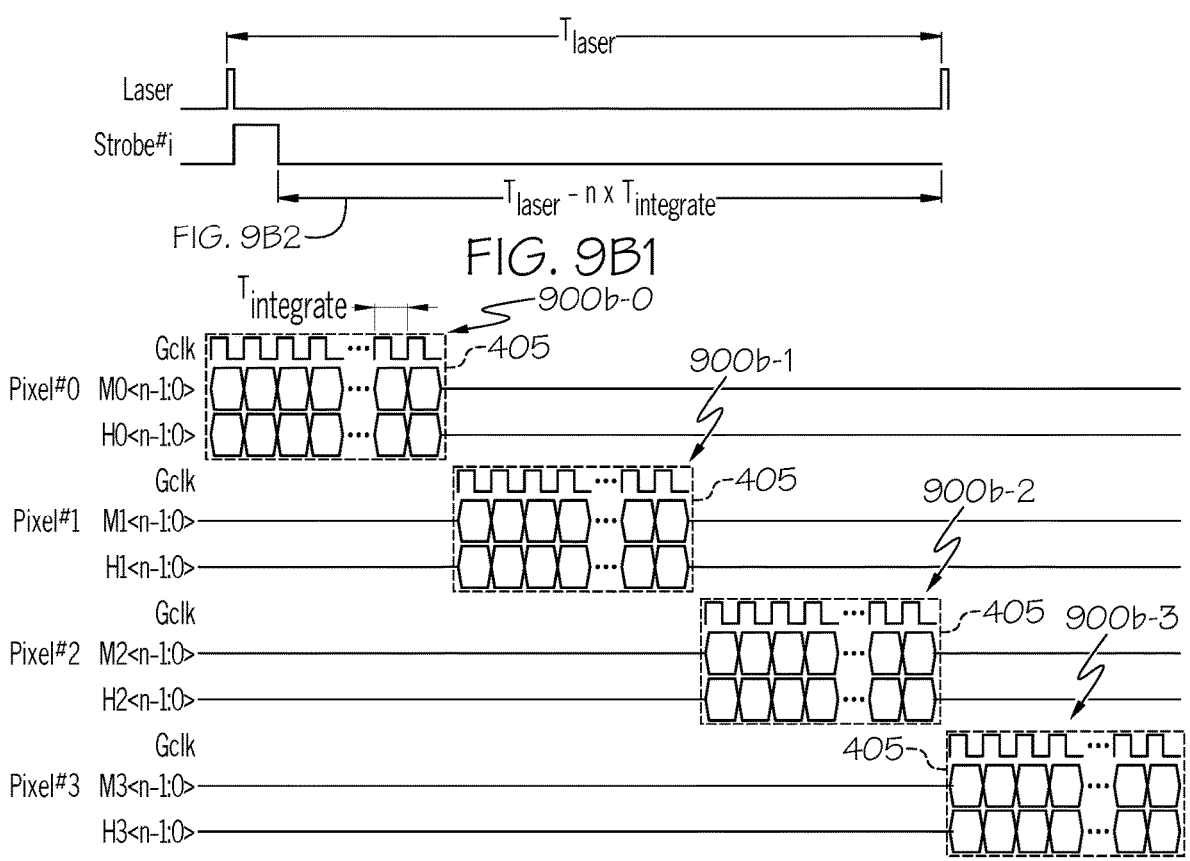
FIG. 9B1
FIG. 9B2

PIPELINED HISTOGRAM PIXEL

CLAIM OF PRIORITY

This application claims priority from U.S. Provisional Patent Application No. 62/958,894, entitled "Pipelined SRAM Histogram Pixel," filed Jan. 9, 2020, in the United States Patent and Trademark Office, the entire contents of which are incorporated by reference herein.

FIELD

The present disclosure is directed to Light Detection and Ranging (LIDAR or lidar) systems, and more particularly, to memory operations in time-of-flight lidar systems.

BACKGROUND

Time of flight (ToF) based imaging is used in a number of applications including range finding, depth profiling, and 3D imaging (e.g., lidar). Direct time of flight measurement includes directly measuring the length of time between emitting radiation and sensing the radiation after reflection from an object or other target. From this, the distance to the target can be determined. Indirect time of flight measurement includes determining the distance to the target by phase modulating the amplitude of the signals emitted by emitter element(s) of the lidar system and measuring phases (e.g., with respect to delay or shift) of the echo signals received at detector element(s) of the lidar system. These phases may be measured with a series of separate measurements or samples.

In specific applications, the sensing of the reflected radiation in either direct or indirect time of flight systems may be performed using an array of photodetectors, such as an array of Single Photon Avalanche Diodes (SPADs). One or more photodetectors may define a detector pixel of the array. SPAD arrays may be used as solid-state detectors in imaging applications where high sensitivity and timing resolution may be required.

A SPAD is based on a semiconductor junction (e.g., a p-n junction) that may detect incident photons when biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively (e.g., by reducing the bias voltage) or passively (e.g., by using the voltage drop across a serially connected resistor), to allow the device to be "reset" to detect further photons. The initiating charge carrier can be photo-electrically generated by a single incident photon striking the high field region. It is this feature which gives rise to the name 'Single Photon Avalanche Diode'. This single photon detection mode of operation is often referred to as 'Geiger Mode'.

When imaging a scene, ToF sensors for LiDAR applications can include circuits that time stamp and/or count incident photons as reflected from a target. Some ToF pixel approaches may use digital or analog circuits to count the detection of photons and the arrival times of photons, also referred to as time-stamping.

Data rates can be compressed by histogramming timestamps; however, this can involve considerable memory resources which may be inefficiently used in typical ToF LIDAR systems. For example, the memory depth of the histogram bins (which may indicate respective subranges of photon arrival times) is typically set by the peak or maximum expected laser returns, whereas, in practice, many or most histogram bins will be sparsely occupied (e.g., only by background noise). In addition, thousands of time bins (each corresponding to respective photon arrival times) may typically be used to form a histogram sufficient to cover the typical time range of a LIDAR system (e.g., microseconds) with the typical time to digital converter (TDC) resolution (e.g., 50-100 ps).

A memory device, such as Dynamic Random Access Memory (DRAM) or Static Random Access Memory (SRAM), may be used for memory storage. SRAM is typically over twenty times more compact per bit than some counters that may be conventionally applied to SPAD pixels. A single bit in a counter is represented by a D-type (or T-type) flip-flop with around 32 transistors in standard cell libraries. In addition a readout cell may be used per bit (usually a tristate buffer). SRAM provides its own challenges, however, in that the read-increment-write logic conventionally incorporated in SRAM configurations may be large and difficult to incorporate in smaller pixel due to layout/space limitations, particularly as speed and storage requirements increase.

SUMMARY

Some embodiments described herein provide a lidar system including one or more emitter units (including one or more semiconductor lasers, such as surface- or edge-emitting laser diodes; generally referred to herein as emitters, which output emitter signals), one or more light detector pixels (including one or more semiconductor photodetectors, such as photodiodes, including avalanche photodiodes and single-photon avalanche detectors; generally referred to herein as detectors, which output detection signals in response to incident light), and one or more control circuits that are configured to selectively operate subsets of the emitter units and/or detector pixels (including respective emitters and/or detectors thereof, respectively) to provide a 3D time of flight (ToF) lidar system. The lidar system circuit may be configured to pipeline execution of memory storage operations for storing data indicated by detection signals received from the photodetectors in first and second memories during different portions of a time between pulses of an emitter signal.

For example, in some embodiments, the control circuit(s) may be configured to perform first or initial memory storage operations, such as write operations, to store data indicated by the detection signals (e.g., to store photon count data into respective bins based on a sampling rate) into a temporary or buffer memory device (e.g., an SRAM buffer) to store the photon counts detected by detectors pixels during a first portion of the time between the pulses of the emitter signal (e.g., during a strobe window corresponding to an imaging distance subrange), and to perform second or main memory storage operations, such as precharge, read, modify, and write operations, to transfer and integrate the data stored in the buffer memory into a main or shared memory device (e.g., to integrate the photon count data into a histogram stored in respective bins of an SRAM memory array) during a second portion of the time between the pulses of the emitter units (e.g., during a remainder of the time between the pulses of the emitter units, after the strobe window and before a next pulse of the pulses of the emitter signal). The first memory storage operations may thus be performed at a higher speed than the second memory storage operations, allowing for shorter clock or sampling cycles for the detector signals, and the period of time for performing the second memory storage operations (e.g., the integration operations) may thus be extended.

In some embodiments, the control circuit(s) may be shared among multiple detector pixels. The respective first memory storage operations may be executed in parallel for multiple detector pixels during the first portion of the time between the pulses of the emitter signal, while the respective second memory storage operations may be executed in series for the respective detector pixels during the second portion of the time between the pulses of the emitter signal.

According to some embodiments, a Light Detection and Ranging (LIDAR) detector circuit includes a non-transitory memory device having a first memory and a second memory, and at least one control circuit. The at least one control circuit is configured to execute first memory storage operations to store data indicated by detection signals received from one or more photodetector elements in the first memory during a first portion of a time between pulses of an emitter signal output from a LIDAR emitter element, and to execute second memory storage operations to include the data, which was stored in the first memory, in the second memory during a second portion of the time between the pulses of the emitter signal.

In some embodiments, the first portion of the time may include a strobe window of activation of the one or more photodetector elements, and the detection signals may be output from the one or more photodetector elements in response to a plurality of photons incident thereon during the strobe window.

In some embodiments, the second portion of the time may include a remainder of the time between the pulses of the emitter signal, after the strobe window and before a next pulse of the pulses of the emitter signal.

In some embodiments, the first and second memory storage operations may be completed within the time between the pulses of the emitter signal.

In some embodiments, the first memory may be a buffer memory device and the second memory may be a main memory device, and the at least one control circuit may be configured to execute the second memory storage operations to transfer the data from the buffer memory to be included in the main memory after the strobe window and before the next pulse of the emitter signal.

In some embodiments, the at least one control circuit may be a sampler circuit that is configured to execute the first memory storage operations, and the first memory storage operations may include sampling the data from the detection signals at a predetermined sampling rate and writing the data to respective bins of the first memory.

In some embodiments, the at least one control circuit may include a memory controller that is configured to execute the second memory storage operations, and the second memory storage operations may include retrieving the data from the respective bins of the first memory and integrating the data into respective bins of the second memory. The respective bins of the second memory may include histogram data for an imaging distance subrange corresponding to the strobe window.

In some embodiments, the memory controller and the second memory may be inactive during the first portion of the time.

In some embodiments, the sampler circuit may be inactive during the second portion of the time.

In some embodiments, the second memory may be static random access memory (SRAM) or dynamic random access memory (DRAM). The second memory storage operations may include precharge and read operations to retrieve the data from the respective bins of the first memory, and precharge, read, modify, and write operations to integrate the data into the respective bins of the second memory.

In some embodiments, a detector interface circuit may be coupled to the at least one control circuit and may be configured to receive the detection signals from the one or more photodetector elements during the first portion of the time. The detector interface circuit may be inactive during the second portion of the time.

In some embodiments, the one or more photodetector elements may be a subset of a plurality of photodetector elements, and respective subsets of the plurality of photodetector elements may define respective detector pixels. The at least one control circuit may be a shared control circuit that is configured to execute the first memory storage operations for the respective detector pixels during the first portion of the time, and is configured to execute the second memory storage operations for the respective detector pixels during the second portion of the time.

In some embodiments, the second memory may include respective main memory devices, and the shared control circuit may be configured to execute the second memory storage operations to store respective data for the respective detector pixels in the respective main memory devices sequentially during the second portion of the time.

In some embodiments, the first memory may include respective buffer memory devices, and the shared control circuit may be configured to execute the first memory storage operations to store respective data for the respective detector pixels in the respective buffer memory devices in parallel during the first portion of the time.

In some embodiments, the at least one control circuit may be configured to execute the first memory storage operations responsive to a first clock signal, and to execute the second memory storage operations responsive to a second clock signal different than the first clock signal.

In some embodiments, the one or more photodetector elements may be single-photon avalanche detectors (SPADs), and the data may be photon counts indicated by the detection signals corresponding to an imaging distance subrange defined by the strobe window.

According to some embodiments, a Light Detection and Ranging (LIDAR) detector circuit includes one or more photodetector elements defining a LIDAR detector pixel, a buffer memory device, a main memory device, and at least one processor circuit. The at least one processor circuit is configured to execute first and second memory storage operations to store data indicated by detection signals received from the LIDAR detector pixel in the buffer and main memory devices during first and second portions of a time between pulses of a LIDAR emitter signal, respectively.

In some embodiments, the first portion of the time may include a strobe window of activation of the LIDAR detector pixel, and the second portion of the time may include a remainder of the time between the pulses of the LIDAR emitter signal, after the strobe window and before a next pulse of the pulses of the LIDAR emitter signal.

In some embodiments, the at least one processor circuit may include a sampler circuit that is configured to execute the first memory storage operations to sample the data from the detection signals at a predetermined sampling rate and write the data to respective bins of the buffer memory device, and a memory controller that is configured to execute the second memory storage operations to retrieve the data from the respective bins of the buffer memory device and integrate the data in respective bins of the main memory device. The respective bins of the main memory device may include histogram data for an imaging distance subrange corresponding to the strobe window.

In some embodiments, the memory controller and the main memory may be inactive during the first portion of the time, and the sampler circuit may be inactive during the second portion of the time.

In some embodiments, the one or more photodetector elements may define a respective LIDAR detector pixel of a plurality of LIDAR detector pixels, and each of the LIDAR detector pixels may be associated with a respective buffer memory device and a respective main memory device. The at least one processor circuit may be a shared control circuit that is configured to execute the first memory storage operations for each of the LIDAR detector pixels in parallel to store respective data indicated by detection signals received therefrom in the respective buffer memory device, and to execute the second memory storage operations for each of the LIDAR detector pixels sequentially to include the respective data in the respective main memory device.

In some embodiments, the at least one processor circuit may be configured to execute the first and second memory storage operations responsive to different first and second clock signals, respectively.

According to some embodiments, a method of operating a Light Detection and Ranging (LIDAR) detector circuit includes executing first memory storage operations to store data indicated by detection signals received from one or more photodetector elements in a first memory during a first portion of a time between pulses of an emitter signal output from a LIDAR emitter element, and executing second memory storage operations to include the data, which was stored in the first memory, in a second memory during a second portion of the time between the pulses of the emitter signal.

In some embodiments, the first portion of the time may include a strobe window of activation of the one or more photodetector elements, and the detection signals may be received from the one or more photodetector elements in response to a plurality of photons incident thereon during the strobe window.

In some embodiments, the second portion of the time may include a remainder of the time between the pulses of the emitter signal, after the strobe window and before a next pulse of the pulses of the emitter signal.

In some embodiments, the executing the first memory storage operations may include sampling the data from the detection signals at a predetermined sampling rate and writing the data to respective bins of the first memory. The executing the second memory storage operations may include retrieving the data from the respective bins of the first memory and integrating the data in respective bins of the second memory. The respective bins of the second memory may include histogram data for an imaging distance subrange corresponding to the strobe window.

In some embodiments, the executing the first and second memory storage operations may include executing the first memory storage operations responsive to a first clock signal, and executing the second memory storage operations responsive to a second clock signal different than the first clock signal.

In some embodiments, the detector circuit may be included in a LIDAR system that is configured to be coupled to an autonomous vehicle such that the emitter element and the one or more detector elements are oriented relative to an intended direction of travel of the autonomous vehicle.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

FIGS. 4A1, 4A2, and 4A3 illustrate a configuration and timing diagram showing buffer memory storage operations that are performed during a first portion of the time between emitter pulses in accordance with some embodiments of the present disclosure.

FIGS. 4B1, 4B2, and 4B3 illustrate a configuration and timing diagram showing main memory storage operations that are performed during a second portion of the time between emitter pulses in accordance with some embodiments of the present disclosure.

FIGS. 5A1-5E3 illustrate example configurations, timing diagrams, and operations of a detector pixel including shared memory sub-arrays and a shared control unit in accordance with some embodiments of the present disclosure. In particular, FIGS. 5A1, 5A2, and 5A3 illustrate buffer memory storage operations that are performed in parallel during a first portion of the time between emitter pulses. FIGS. 5B1, 5B2, and 5B3, FIGS. 5C1, 5C2, and 5C3, FIGS. 5D1, 5D2, and 5D3, and FIGS. 5E1, 5E2, and 5E3 illustrate main memory storage operations that are sequentially performed during a second portion of the time between emitter pulses.

FIGS. 6B1, 6B2, and 6B3 illustrate an example schematic block diagram, timing diagram, and operations of a SPAD pixel processing circuit.

FIGS. 7A1 and 7A2 and FIGS. 7B1 and 7B2 are timing diagrams illustrating example operations of the pipelined histogramming pixel during respective portions of the time between emitter pulses in accordance with some embodiments of the present disclosure.

FIGS. 9A1 and 9A2 and FIGS. 9B1 and 9B2 are timing diagrams illustrating example operations of the shared pipelined histogramming pixel during respective portions of the time between emitter pulses in accordance with some embodiments of the present disclosure.

DETAILED DESCRIPTION

Figure 1:
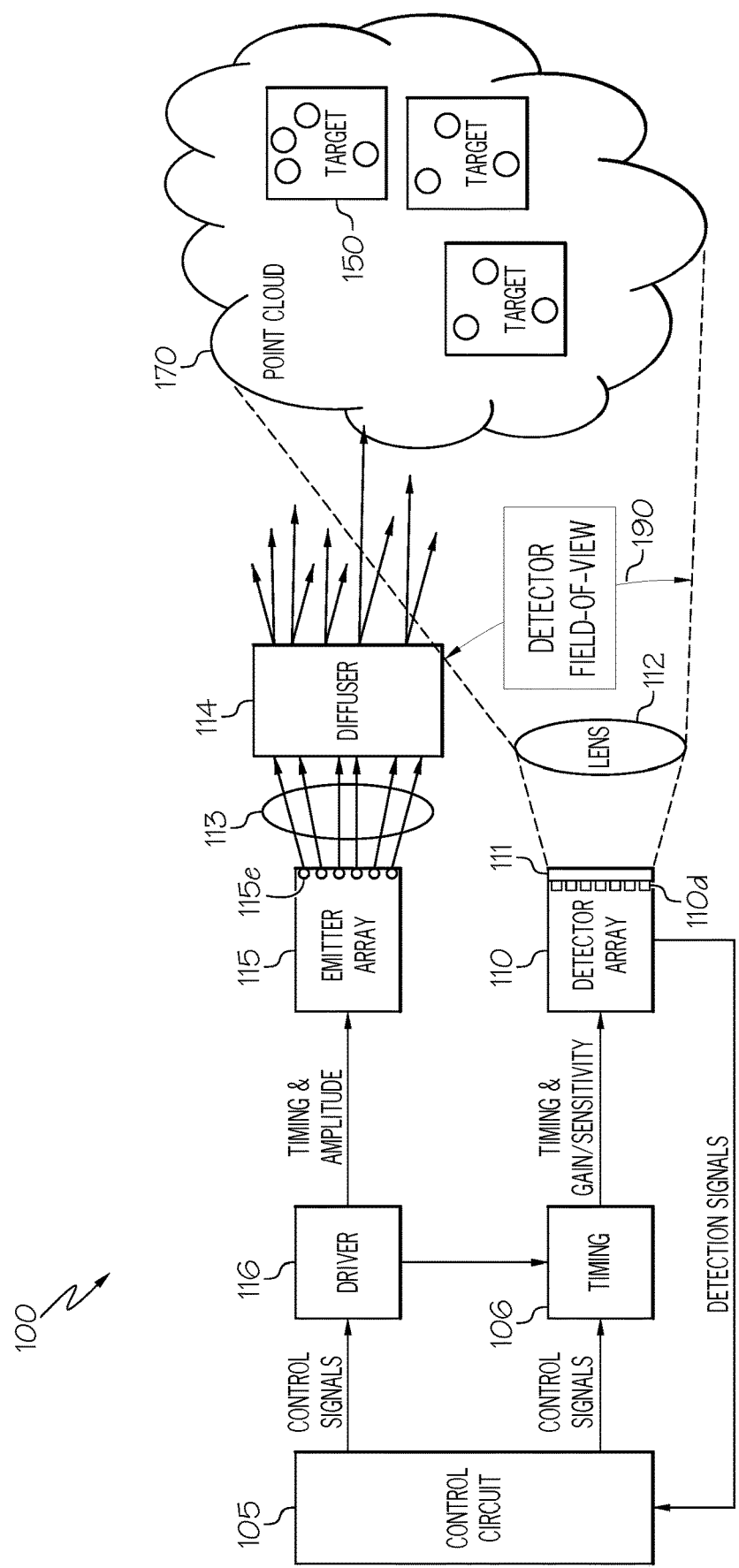
FIG. 1 is a schematic block diagram illustrating an example of a LIDAR system or circuit that utilizes pipelined memory storage operations in accordance with embodiments of the present disclosure.

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components, and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire images by emitting light from an array of emitters, or a subset of the array, for short durations (pulses) over a field of view (FoV) or scene, and detecting the echo signals reflected from one or more targets in the FoV at one or more detectors. A non-flash or scanning lidar system may generate image frames by scanning light emission (e.g., continuously) over a field of view or scene, for example, using a point scan or line scan to emit the necessary power per point and sequentially scan to reconstruct the full FoV.

In embodiments described herein, a detection window or strobe window may refer to the respective durations of activation and deactivation of one or more detectors (e.g., responsive to respective detector time gates or strobe signals from a control circuit) over a temporal period or time between pulses of the emitter(s) (which may likewise be responsive to respective emitter control signals from a control circuit).

Some embodiments of the present disclosure may arise from realization that the memory depth of the histogram bins (which may indicate respective subranges of photon arrival times) is typically set by the peak or maximum expected laser returns, which may impose limitations on memory size, read/write times, and/or power consumption. For example, it may be desirable to employ a short (e.g., between about 1 nanosecond (ns) to about 10 ns) clock cycle and multi-bin center of mass to histogram over distance subranges (e.g., using 10 meter (m) strobe signals) to achieve a desired system power and range resolution at a desired imaging distance range (e.g., 100 m, 200 m, etc.) for a typical lighting scenario (e.g., in terms of light levels/luminous flux and/or target reflectivity). This example scenario may involve storage requirements (e.g., in terms of bins and/or bits) that can exceed the available area of some pixels. That is, it may be desirable to increase the area available "in-pixel" (e.g., with each detector pixel including or providing outputs to dedicated circuits, such as storage and/or logic circuits (including correlator, counter, and/or time integrator logic), which are not shared with other pixels) and devoted to storage (e.g., SRAM, DRAM) to allow higher bit depth photon counting (e.g., for improved tolerance of retro-reflectors and high background (non-signal) photon detection) and more histogram bins (e.g., for longer strobe windows to increase proportion of time for light gathering in laser cycle time, reducing laser emitter power requirements).

Moreover, the precharge-read-modify-write (PRMW) memory storage operations of some memory devices (which can record detection of photons and integrate the detection events into stored data simultaneously) can require more time to store the detection events (e.g., in memory bins), thus limiting the minimum required bin time. For example, the period of the short clock cycles (e.g., less than about 5 ns) noted above may allow insufficient time to perform the required memory storage operations. That is, it may be desirable to reduce the bin time to improve temporal/depth resolution. In addition, peak power consumption of such memory storage operations (e.g., the SRAM PRMW cycle) may be relatively high, which may cause power distribution, IR (current-resistance) drop, and/or EMI issues. For example, centrally-located detector pixels in the array may experience higher IR drops and reduced power supply, which can slow down their operation and cause the PRMW loop to fail, thereby corrupting values written into histogram bins for these pixels.

Accordingly, some embodiments of the present disclosure may provide methods, systems, and devices including electronic circuits to address the above and other problems by pipelining the memory storage operations for execution during different portions of an emitter pulse cycle. For example, some embodiments may provide processing and/or control circuits that are configured to store photon counts (e.g., SPAD photon counts, as a log 2(k)-bit number) during a strobe window into a temporary memory (e.g., a buffer memory, such as an SRAM buffer, with a number of bins n) at or within the shorter clock cycle (e.g., less than 5 ns). Only write operations may be performed during the strobe window, which can be very fast and low power in comparison to the typical memory storage operations (e.g., the full PRMW cycle for a SRAM device). For example, performing precharge-write operations can be accomplished on the even/odd phases of a clock signal controlling precharge and write, respectively. During the time outwith or outside of the strobe window (that is, during the remainder of the time between pulses of the emitter units after the strobe window but before the next emitter pulse), the more time-consuming memory storage operations for storing and/or integrating the photon counts into a main memory (e.g., an n-bins×m-bits per bin SRAM array) may be performed at lower clock rate. For example, for an SRAM-based memory, during the time outwith or outside of the strobe window, the SRAM PRMW cycle may be performed at a reduced clock period to transfer and integrate the photon counts stored in the buffer memory into the main SRAM histogram memory.

For example, for a detector pixel including k detectors (e.g., SPADs) per pixel with a temporary or buffer memory including n-histogram bins and storing m-bits per histogram bin (with $2^{m-1}$ maximum photon counts/bin), the time to complete the memory storage operations in accordance with embodiments of the present disclosure may be defined by the number of bins n times the duration of each histogram bin $T_{sample}$ plus the duration of the memory storage operations $T_{integrate}$, that is, $n \times (T_{sample} + T_{integrate}) = T_{laser}$, where $T_{laser}$ is the period of the emitter signal. As such, $f_{sample} = 1/T_{sample}$ may represent the rate at which the detector outputs can be sampled (described herein with reference to sampling clock signal SClk), with $T_{integrate}$ being the duration of a precharge-read-modify-write (PRMW) integration cycle, and $f_{integrate}=1/T_{integrate}$ the associated frequency of the PRMW integration cycle (described herein with reference to integration clock signal GClk).

In a particular example, for a 100 m imaging range or distance d, the frequency $f_m$ of the emitter signal may be determined to be 1.5 MHz (from the equation $d=c/2f_m$), and the period of the emitter signal $T_{laser}$ may be 667 ns. For a 24-bin memory with a 5 ns clock, the time outwith or outside of the strobe window may be 667 ns−24×5 ns=547 ns to perform the PRMW cycle at low clock rate to update the histogram memory.

While distance accuracy may improve with shorter bin sizes, shorter bin times would require faster PRMW cycles, which may be more difficult to achieve. A pipelining operation in accordance with embodiments of the present disclosure decouples the first and second memory storage operations (i.e., sampling and integration, respectively), allowing sampling at short intervals and integration at longer intervals (provided the total time for the first and second memory storage operations fits inside or can be accomplished within a laser repetition period). Although described primarily herein with reference to SRAM-based buffer and main memory devices, it will be understood that embodiments of the present disclosure may provide similar benefits using DRAM (dynamic random access memory)-based memory devices or other memory device technologies. For example, DRAM may be even more compact than SRAM, and the first and second memory storage operations described herein can be similarly performed in conjunction with a refresh mechanism for the DRAM memory cells (which is not required for SRAM, which holds state). More generally, embodiments of the present disclosure are not limited to SRAM, DRAM, or any particular memory storage technology, and may be applied to memory devices other than those specifically described herein.

An example of a lidar system or circuit 100 that may utilize pipelined memory storage operations in accordance with embodiments of the present disclosure is shown in FIG. 1. The lidar system 100 includes a control circuit 105, a timing circuit 106, an emitter array 115 including a plurality of emitters 115e, and a detector array 110 including a plurality of detectors 110d. The detectors 110d include time-of-flight sensors (for example, an array of single-photon detectors, such as SPADs). One or more of the emitter elements 115e of the emitter array 115 may define emitter units that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures and/or calculates the time of flight of the illumination pulse over the journey from emitter array 115 to target 150 and back to the detectors 110d of the detector array 110, using direct or indirect ToF measurement techniques.

In some embodiments, an emitter module or circuit 115 may include an array of emitter elements 115e (e.g., VCSELs), a corresponding array of optical elements 113,114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power and/or the repetition rate of the light output by the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude of the optical emission signals that are output from the emitters 115e.

The emission of optical signals from multiple emitters 115e provides a single image frame for the flash LIDAR system 100, but embodiments of the present disclosure may include non-flash or scanning LIDAR systems as well. The maximum optical power output of the emitters 115e may be selected to generate a signal-to-noise ratio of the echo signal from the farthest, least reflective target at the brightest background illumination conditions that can be detected in accordance with embodiments described herein. An optional filter to control the emitted wavelengths of light and diffuser 114 to increase a field of illumination of the emitter array 115 are illustrated by way of example.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1.

In some embodiments, a receiver/detector module or circuit 110 includes an array of detector pixels (with each detector pixel including one or more detectors 110d, e.g., SPADs), receiver optics 112 (e.g., one or more lenses to collect light over the FoV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include a macro lens that is configured to collect light from the largest FoV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity. In some embodiments, a control circuit 105, such as a microcontroller or microprocessor, provides different emitter control signals to the driver circuitry 116 of different emitters 115e and/or provides different signals (e.g., strobe signals) to the timing circuitry 106 of different detectors 110d to enable/disable the different detectors 110d so as to detect the echo signal from the target 150. 'Strobing' as used herein may refer to the generation of detector control signals (also referred to herein as strobe signals or 'strobes') to control the timing and/or duration of activation (detection or strobe windows) of one or more detectors 110d of the lidar system 100. The control circuit 105 may also control memory storage operations for storing data indicated by the detection signals in a non-transitory memory or memory array that is included therein or is distinct therefrom.

Figure 2:
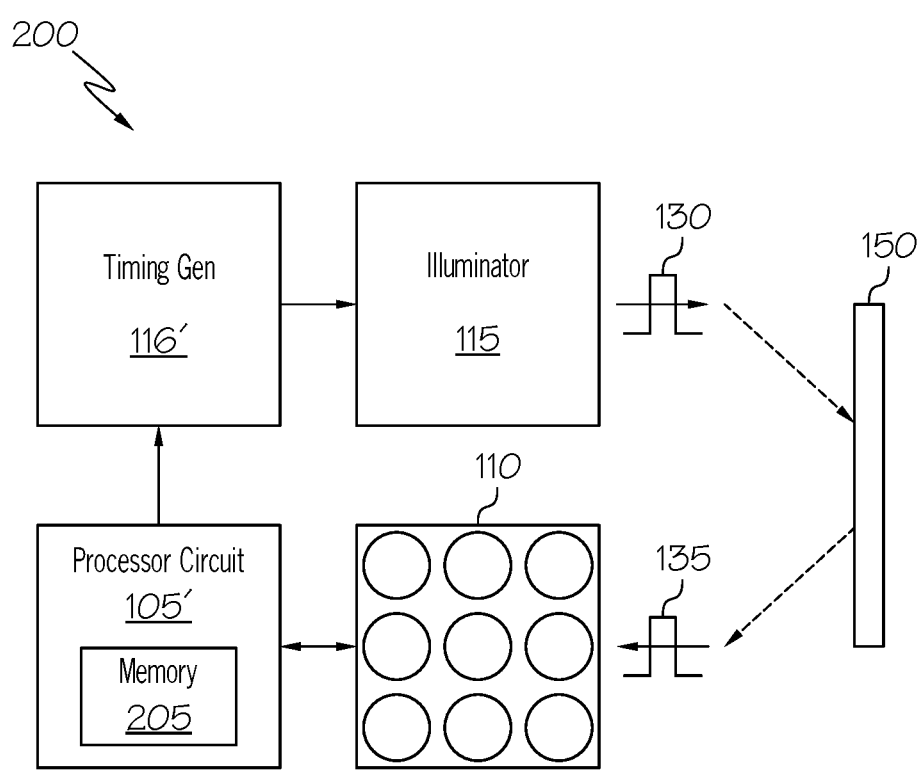
FIG. 2 is a schematic block diagram further illustrating components of a measurement system or circuit in a LIDAR application in accordance with some embodiments of the present disclosure.

FIG. 2 further illustrates components of a ToF measurement system or circuit 200 in a LIDAR application in accordance with some embodiments described herein. The circuit 200 may include a processor circuit 105' (such as a digital signal processor (DSP)), a timing generator 116' which controls timing of the illumination source (illustrated by way of example with reference to a laser emitter array 115), and an array of single-photon detectors (illustrated by way of example with reference to a single-photon detector array 110). The processor circuit 105' may also include a sequencer circuit that is configured to coordinate operation of the emitters 115e and detectors 110d.

The processor circuit 105' and the timing generator 116' may implement some of the operations of the control circuit 105 and the driver circuit 116 of FIG. 1. The laser emitter array 115 emits a laser pulse 130 at a time controlled by the timing generator 116'. Light 135 from the laser pulse 130 is reflected back from a target (illustrated by way of example as object 150), and is sensed by single-photon detector array 110. The processor circuit 105' implements a pixel processor that measures the ToF of the laser pulse 130 and its reflected signal 135 over the journey from emitter array 115 to object 150 and back to the single-photon detector array 110.

The processor circuit 105' may provide analog and/or digital implementations of logic circuits that provide the necessary timing signals (such as quenching and gating or strobe signals) to control operation of the single-photon detectors of the array 110 and process the detection signals output therefrom. For example, the single-photon detectors of the array 110 may generate detection signals in response to incident photons only during the short gating intervals or strobe windows that are defined by the strobe signals. Photons that are incident outside the strobe windows have no effect on the outputs of the single photon detectors. More generally, the processor circuit 105' may include one or more circuits that are configured to generate the respective detector control signals that control the timing and/or durations of activation of the detectors 110d, and/or to generate respective emitter control signals that control the output of optical signals from the emitters 115e.

Detection events may be identified by the processor circuit 105' based on one or more photon counts indicated by the detection signals output from the detector array 110, which may be stored in a non-transitory memory 205. In some embodiments, the processor circuit 105' may include a correlation circuit or correlator that identifies detection events based on photon counts (referred to herein as correlated photon counts) from two or more detectors within a predefined window of time relative to one another, referred to herein as a correlation window or correlation time, where the detection signals indicate arrival times of incident photons within the correlation window. As photons corresponding to the optical signals output from the emitter array 115 (also referred to as signal photons) may arrive relatively close in time as compared to photons corresponding to ambient light (also referred to as background photons), the correlator is configured to distinguish signal photons based on respective times of arrival within the correlation time relative to one another. Such correlators are described, for example, in U.S. Patent Application Publication No. 2019/0250257 entitled "Methods and Systems for High-Resolution Long Range Flash Lidar," which is incorporated by reference herein.

The processor circuit 105' may be small enough to allow for three-dimensionally stacked implementations, e.g., with the array 110 "stacked" on top of processor circuit 105' (and other related circuits) that is sized to fit within an area or footprint of the array 110. For example, some embodiments may implement the detector array 110 on a first substrate, and transistor arrays of the circuits 105' on a second substrate, with the first and second substrates/wafers bonded in a stacked arrangement, as described for example in U.S. patent application Ser. No. 16/668,271 entitled "High Quantum Efficiency Geiger-Mode Avalanche Diodes Including High Sensitivity Photon Mixing Structures and Arrays Thereof," filed Oct. 30, 2019, the disclosure of which is incorporated by reference herein.

The pixel processor implemented by the processor circuit 105' is configured to calculate an estimate of the average ToF aggregated over thousands of laser pulses 130 and photon returns in reflected light 135. The processor circuit 105' may be configured to count incident photons in the reflected light 135 to identify detection events (e.g., based on one or more SPADs 110 that have been "triggered") over a laser cycle (or portion thereof). The timings and durations of the detection windows may be controlled by a strobe signal (Strobe #i or Strobe<i>) as described herein. Many repetitions of Strobe #i are aggregated (e.g., in the pixel) to define a sub-frame for Strobe #i, with subframes i=1 to N defining an image frame. Each sub-frame for Strobe #i may correspond to a respective distance sub-range of the overall imaging distance range, which is defined by the frequency of the laser cycle.

Figure 3:
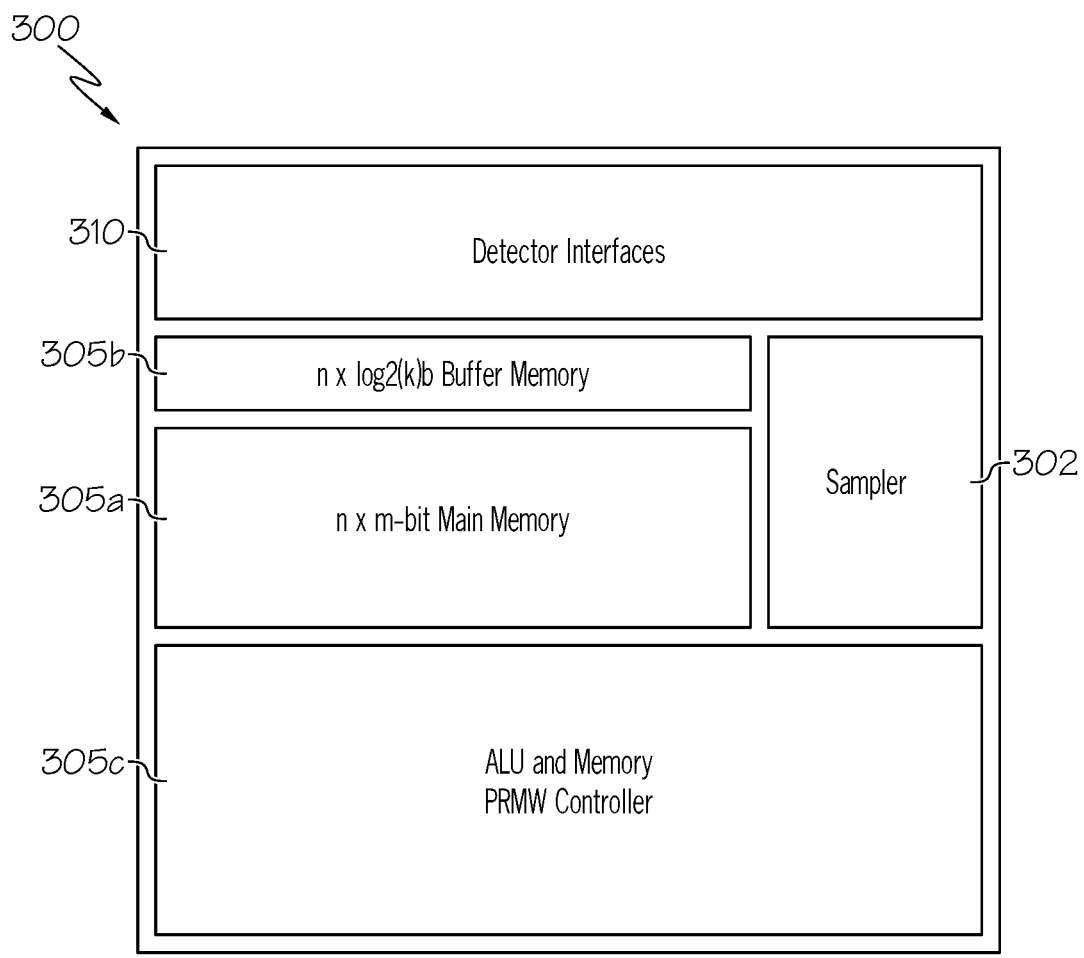
FIG. 3 is a schematic block diagram illustrating an example configuration of a memory circuit implementing a memory pixel in accordance with some embodiments of the present disclosure.

In some embodiments, a detector pixel may include circuits that implement a memory array (e.g., memory 205) and a memory controller (e.g., control circuit 105/processor 105'), such as an SRAM and PRMW controller, collectively referred to herein as a memory circuit. FIG. 3 illustrates an example configuration of a memory circuit implementing a memory pixel 300 (e.g., an SRAM pixel or DRAM pixel) in accordance with some embodiments of the present disclosure. In particular, the memory pixel 300 of FIG. 3 may represent a lower or bottom tier of a pixel layout, for example, on which an array of detector pixels 110 may be stacked to define a three-dimensionally stacked implementation. The memory pixel 300 of FIG. 3 may thus be sized to fit within the area or footprint of the detector array 110.

The memory pixel of FIG. 3 includes a photodetector interface circuit 310 configured to receive detection signals from one or more photodetectors (e.g., SPADs), a sampler circuit 302 (illustrated as a sampler) configured to sample the detection signals output from the photodetectors, a main memory device 305a configured to store histogram data (illustrated as a n×m SRAM device, where n refers to the number of histogram bins and m refers to the bits per bin), and a controller circuit 305c (illustrated as an arithmetic logic unit (ALU) and PRMW controller) that is configured to manage operations of the interface circuit 310, the sampler 302, and the main memory device 305a to store and integrate data indicated by the detection signals output from the photodetectors into the histogram data.

As shown in FIG. 3, in accordance with some embodiments of the present disclosure, the memory pixel 300 further includes a buffer memory device 305b (illustrated as n×log 2(k)-bit buffer memory). In embodiments of the present disclosure, the buffer memory device 305b is used for pipelining memory storage operations, and may be only active during a portion of the time between emitter pulses (i.e., the emitter pulse cycle), for example, during a strobe window. The time between emitter pulses (which defines a laser cycle, or more generally emitter pulse frequency) may be selected or may otherwise correspond to a desired imaging distance range for the lidar system.

For example, FIGS. 4A1-5E3 and 8-9B2 illustrate a time or laser period $T_{laser}$ (e.g., of about 667 ns) between pulses of the emitter (illustrated as a Laser), which corresponds to an approximate emitter pulse frequency of 1.5 MHz, and may be used to effectively illuminate targets at an overall imaging distance range of about 100 m. The timing of the emitter pulses may be controlled responsive to a control signal, such as an emitter enable signal, which may be provided by a control circuit (e.g., control circuit 105 and/or driver circuit 116 of FIG. 1) to control the laser or other emitter element to emit or 'fire' a pulse (e.g., a laser pulse). The emitter enable signal may define an acquisition operation of the lidar system by triggering emission of a laser pulse. At that time, or shortly thereafter (in order to avoid triggering the SPADs from nearby reflections), or shortly before (in order to ensure that the SPADs are fully charged up by the time the laser fires so as not to miss nearby targets), one or more detectors of the SPAD array are activated or "charged" to detect arriving photons by undergoing an avalanche. This is illustrated, for example, by the detector control signals or strobe signals (illustrated as Strobe #i) in FIGS. 4A1-5E3 and 8-9B2, where the timing of the strobe signal (Strobe #i) relative to the time between pulses of the emitter (Laser) corresponds to a respective distance sub-range of the overall imaging distance range defined by the emitter pulse frequency.

The strobe signals may be configured to activate the one or more detectors (e.g., SPADs) of the detector array so as to remain active for the duration of a strobe window, to indicate detection of photons having arrival times corresponding to a respective distance sub-range. Respective strobe signals may be applied to activate the detectors with different delays relative to the time between pulses of the emitter to sequentially cycle through the respective distance sub-ranges. In some embodiments, during the activation or recharging of the detectors, the detection probabilities for a photon may vary over time. Thus, the detector may be activated just before the start of the strobe window but the sampling circuit may only process the output of the detector once the strobe window begins. Similarly, the detector may initiate its turn-off or forced discharge after the end of the strobe window but the processing circuit may disable input from the detector's output immediately upon the end of the strobe window. Thus, the detectors may be active for a longer duration (i.e., the duration of the strobe signal Strobe #i) than the strobe window but the processing circuit may only process their output during the strobe window, for example, responsive to a sampling cycle or clock cycle that is sufficiently short to allow multiple samples of a detector output to be collected during the strobe window.

As illustrated in FIGS. 4A1-5E3 and 8-9B2, the detection events (illustrated as SPAD events S<log 2(k):0>) may be sampled (e.g., periodically, responsive to a sampling clock signal Sclk) and stored or saved in respective memory bins (e.g., Bin #1 to Bin #n; illustrated as M<n−1:0>) of a temporary or buffer memory 305b in initial write operations, e.g., during the strobe window. The data M<n−1:0> stored in the buffer memory 305b may be subsequently stored (e.g., responsive to an integration clock signal Gclk) in respective memory bins of the main memory 305a (illustrated as histogram data (H<n−1:0>) in main memory storage operations, e.g., during the time outwith or outside of the strobe window but before the next emitter signal pulse. In contrast, some conventional implementations may not sample into a buffer memory, but rather, all photon detection events (e.g., SPAD events) may be sampled and stored in the histogram data (H<n−1:0>) in the main memory during the strobe window, requiring the memory precharge-read-modify-write (PRMW) loop to be completed within each sample cycle.

In the respective operations illustrated in FIGS. 4A1-5E3, the greyed or shaded blocks represent portions of the memory pixel that are active for the illustrated operation (and corresponding portion of the time between emitter pulses), while the unshaded blocks represent portions of the memory pixel that are inactive for the illustrated operation. FIGS. 4A1-4A3 illustrates a configuration and timing diagram 400a showing memory storage operations of the memory pixel 300 of FIG. 3 that are performed during a first portion of the time between emitter pulses (Laser) in accordance with some embodiments of the present disclosure, illustrated by way of example with reference to sampling operations performed during a strobe window. In particular, FIGS. 4A1-4A3 illustrates operation of the sampler circuit 302 to perform write operations (W) by sampling the detection events S<log 2(k):0> based on the detection signals received via the detector interface 310 and storing the counts of the detection events into a temporary or buffer memory device 305b during a strobe window (defined by strobe signal Strobe #i). As noted above, the strobe window corresponding to Strobe #i represents a distance sub-range, and is active for only a corresponding portion of the time between emitter pulses $T_{laser}$. As only write operations (W) are performed during each sample cycle $T_{sample}$ of the strobe window, the respective write operations of FIG. 4A can be performed at a relatively high rate, for example, within the time period $T_{sample}$ of a first clock cycle defined by the sampling clock signal $S_{clk}$ (e.g., 1 to 10 ns for a 1 GHz to 100 MHz clock signal).

FIGS. 4B1-4B3 illustrates a configuration and timing diagram 400b showing memory storage operations of the memory pixel 300 of FIG. 3 that are performed during a second portion of the time between emitter pulses (Laser) in accordance with some embodiments of the present disclosure, illustrated by way of example with reference to integrating the sampled detection events or SPAD states into stored histogram data (e.g., previously stored for the same distance sub-range or image subframe during one or more previous emitter cycles). In particular, FIGS. 4B1-4B3 illustrates operations 405 of the ALU and PRMW controller 305c to perform precharge and read operations (PR) to retrieve and transfer the data M<n–1:0> stored in the buffer memory device 305b, and precharge, read, modify, and write operations (PRMW) to sum or otherwise integrate the data M<n–1:0> stored in the buffer memory device 305b into the corresponding bins of the histogram data H<n–1:0> stored in the main memory device 305a for the distance sub-range corresponding to the strobe window. For example, in a precharge-read-modify-write operation, the current contents of a given histogram bin, which may be indexed by the clock period, are readout and added to the data stored in a corresponding bin of the buffer memory device 305b. The result (e.g., H<n–1:0>) may then be written back to the respective histogram bin of the main memory device 305a. The memory storage operations of FIGS. 4B1-4B3 are performed after the strobe window (defined by Strobe #i) and during the remainder of the time $T_{laser}$ between emitter pulses, which is comparatively longer than the strobe window. As such, the remaining memory operations (e.g., Precharge, Read, Modify, Write operations for an SRAM device) can be performed at a comparatively lower rate than the write operations into the buffer memory device 305b performed in FIGS. 4A1-4A3. For example, the respective memory storage operations 405 of FIGS. 4B1-4B3 may be performed within the time period $T_{integrate}$ (also referred to as $T_{prmw}$) of a second clock cycle defined by signal $G_{clk}$ (which has a greater period than signal $S_{clk}$), where the remaining time between emitter pulses (after the strobe window and before the next emitter pulse) may be represented by $T_{laser} - n \times T_{sample}$, or as $n \times T_{integrate}$.

In some embodiments, the controller 305c (e.g., the ALU and PRMW controller) may be shared among multiple detector pixels, and may be configured to multiplex access to the main memory 305a among the detector pixels during respective portions of the time between emitter pulses. In such a shared controller configuration, more of the available pixel area can be used for main memory 305a (e.g., SRAM bins) by sharing the controller 305c between a number of adjacent pixels. For example, sharing a controller 305c amongst p pixels may free up p–1 ALU area for use as memory (at the cost of some multiplexing logic), and the PRMW time may be reduced to $T_{integrate} = (T_{laser} - n \times T_{sample})/(n \times p)$.

An example configuration of detector pixels with multiple shared memory sub-arrays or banks and a shared controller is illustrated in FIGS. 5A1-5E3. The PRMW controller may be shared among the detectors of the detector pixel and may be configured to multiplex access to the shared memory between the detectors of the detector pixel. The PRMW controller may be configured to control an access to the shared memory by the detectors (e.g., the SPADs) of the detector pixel during a second duration of time between the pulses of the emitter signal (e.g., during the time outwith or outside of the strobe window).

In particular, FIGS. 5A1-5E3 illustrate example configurations and timing diagrams showing the relationship between the strobe signal (which enables the detectors to detect incident photons corresponding to a particular distance sub-range) and the PRMW operations of the detector pixel including shared memory sub-arrays and a 4-way shared ALU, configured as a bottom tier of a 4-pixel layout including detector pixels Pixel #0, Pixel #1, Pixel #2, and Pixel #3. The operations of FIGS. 5A1-5A3 may be performed by one or more sampler circuits 502-0 to 502-3 (collectively 502) during a first portion of the time between emitter pulses (e.g., during a strobe window). The operations of FIGS. 5B1-5E3 may be performed by the shared controller circuit 505c during a second portion of the time between emitter pulses (e.g., during the time outwith or outside of a strobe window, that is, the time between the end of the strobe window and the next emitter pulse).

As shown in FIGS. 5A1-5A3, first memory operations 500a in which output signals from respective detectors (e.g., SPADs) are sampled and written to respective buffer memory locations or devices of corresponding memory pixels are performed in parallel during a first portion of the time between emitter pulses, e.g., during a strobe window. In particular, FIGS. 5A1-5A3 illustrates operation of respective sampler circuits 502-0 to 502-3 to perform write operations (W) by sampling the detection events S<log 2(k):0> based on the detection signals received via respective detector interfaces 510-0 to 510-3 and storing the counts of the detection events into a temporary or buffer memory device 505b-0 to 505b-3 during a strobe window (defined by strobe signal Strobe #i). As only write operations (W) are performed during each sample cycle $T_{sample}$ of the strobe window, the respective write operations to the respective temporary memory device 505b-0 to 505b-3 of FIGS. 5A1-5A3 can be performed in parallel at a relatively high rate, for example, within the time period $T_{sample}$ of a first clock cycle defined by signal $S_{clk}$ (e.g., 1 to 10 ns for a 1 GHz to 100 MHz clock signal).

As shown in FIGS. 5B1-5E3, second memory operations 500b-0 to 500b-3 in which data from the respective buffer memory locations or devices 505b-0 to 505b-3 are transferred and integrated into respective main memory locations or devices 505a-0 to 505a-3 are performed sequentially or in series during a second portion of the time between emitter pulses, e.g., during the time outwith the strobe window, that is, the portion of the time between emitter pulses that is after the strobe window but before the next emitter pulse. For example, in FIGS. 5B1-5B3, the second memory operations 500b-0 are performed during a first part of the second or remaining portion of the time between emitter pulses, e.g., during a first part of the time outwith or outside of the strobe window (illustrated by shading in the timing diagram of FIGS. 5B1-5B3).

In particular, FIGS. 5B1-5B3 illustrates operations of the ALU and PRMW controller 505c to perform operations 405 (similar to those shown in FIGS. 4B1-4B3) including precharge and read operations (PR) to retrieve the data M0<n–1:0> for a first detector pixel Pixel #0 stored in a buffer memory device 505b-0, and precharge, read, modify, and write operations (PRMW) to sum or otherwise integrate the data M0<n–1:0> stored in the buffer memory device 505b-0 for pixel Pixel #0 into the corresponding bins of the histogram data H0<n–1:0> stored in the main memory device 505a-0 for the distance sub-range corresponding to the strobe window Strobe #i.

Second memory storage operations 500b-1, 500b-2, and 500b-3 similar to those illustrated in FIGS. 5B1-5B3 are performed sequentially in FIGS. 5C1-5C3, 5D1-5D3, and 5E1-5E3 during respective parts of the second or remaining portion of the time between emitter pulses, e.g., during second, third, and fourth parts of the time outwith or outside of the strobe window (illustrated by shading in the timing diagrams of FIGS. 5C1-5C3, 5D1-5D3, and 5E1-5E3, respectively), although not necessarily in the sequence shown. In particular, FIGS. 5C1-5C3, 5D1-5D3, and 5E1-5E3 illustrate operations of the ALU and PRMW controller 505c to perform precharge and read operations (PR) to retrieve the data M1<n–1:0>, M2<n–1:0>, and M3<n–1:0> stored in one or more buffer memory devices 505b-1, 505b-2, and 505b-3 for a second, third, and fourth detector pixel Pixel #1, Pixel #2, and Pixel #3, respectively. FIGS. 5C1-5C3, 5D1-5D3, and 5E1-5E3 further illustrate operations of the ALU and PRMW controller 505c to perform precharge, read, modify, and write operations (PRMW) to sum or otherwise integrate the data M1<n–1:0>, M2<n–1:0>, and M3<n–1:0> stored in the buffer memory device(s) 505b-1, 505b-2, and 505b-3 for second, third, and fourth detector pixel Pixel #1, Pixel #2, and Pixel #3, respectively, into the corresponding bins of the histogram data H1<n–1:0>, H2<n–1:0>, and H3<n–1:0> stored in the main memory devices 505a-1, 505a-2, and 505a-3 for the distance sub-range corresponding to the strobe window Strobe #i.

The second memory storage operations 500b-0, 500b-1, 500b-2, and 500b-3 of FIGS. 5B1-5B3, 5C1-5C3, 5D1-5D3, and 5E1-5E3 are performed sequentially during respective parts of the remainder of the time $T_{laser}$ between emitter pulses after the strobe window, and may be performed at a comparatively lower rate than the write operations into the buffer memory device performed in FIGS. 5A1-5A3. For example, the respective memory storage operations of FIGS. 5B1-5B3, 5C1-5C3, 5D1-5D3, and 5E1-5E3 may collectively be performed within the time period $T_{integrate}=(T_{laser}-n\times T_{sample})/(n\times p)$ of the second clock cycle defined by signal $G_{clk}$.

The shared configuration of a controller and memory sub-arrays shown in the example of FIGS. 5A1-5E3 may provide several advantages. For example, because the main memory storage operations (e.g., the memory PRMW operations) may be performed at a reduced rate, peak power peaks can be reduced and distributed (e.g., sequentially per pixel) over the duration of the laser cycle $T_{laser}$, as the time for performing the sampling operations $T_{sample}$ is not coupled to (and is independent of) the time for performing the main memory integration and updating $T_{integrate}$. Also, performing the main memory storage operations at the reduced rate allows the ALU and PRMW hardware (e.g., drivers, precharge, and latch circuitry) to be shared. For example, p pixels can share this circuitry and still operate at a relaxed cycle time of $T_{integrate}=(T_{laser}-n\times T_{sample})/(n\times p)$. In addition, performing the main memory storage operations at the reduced rate allows for reasonable or comfortable settling times even with increased memory size, while increasing the available area in the pixel that can be allocated to SRAM bins and bits.

Sharing the ALU and PRMW hardware among multiple detector pixels in accordance with embodiments of the present disclosure can reduce the overhead (e.g., the logic circuits used for processing operations described herein) per detector pixel. For example, area which is not used by per-pixel PRMW hardware can instead be used for additional memory cells. In some embodiments, this may provide up to about 20 times more efficient density of memory cells for additional histogram bins and bits. Also, longer strobe windows may be used to gather more light in a laser cycle and reduce the power required of the emitter, which can reduce device costs, area requirements, and/or power efficiency.

Figure 6A:
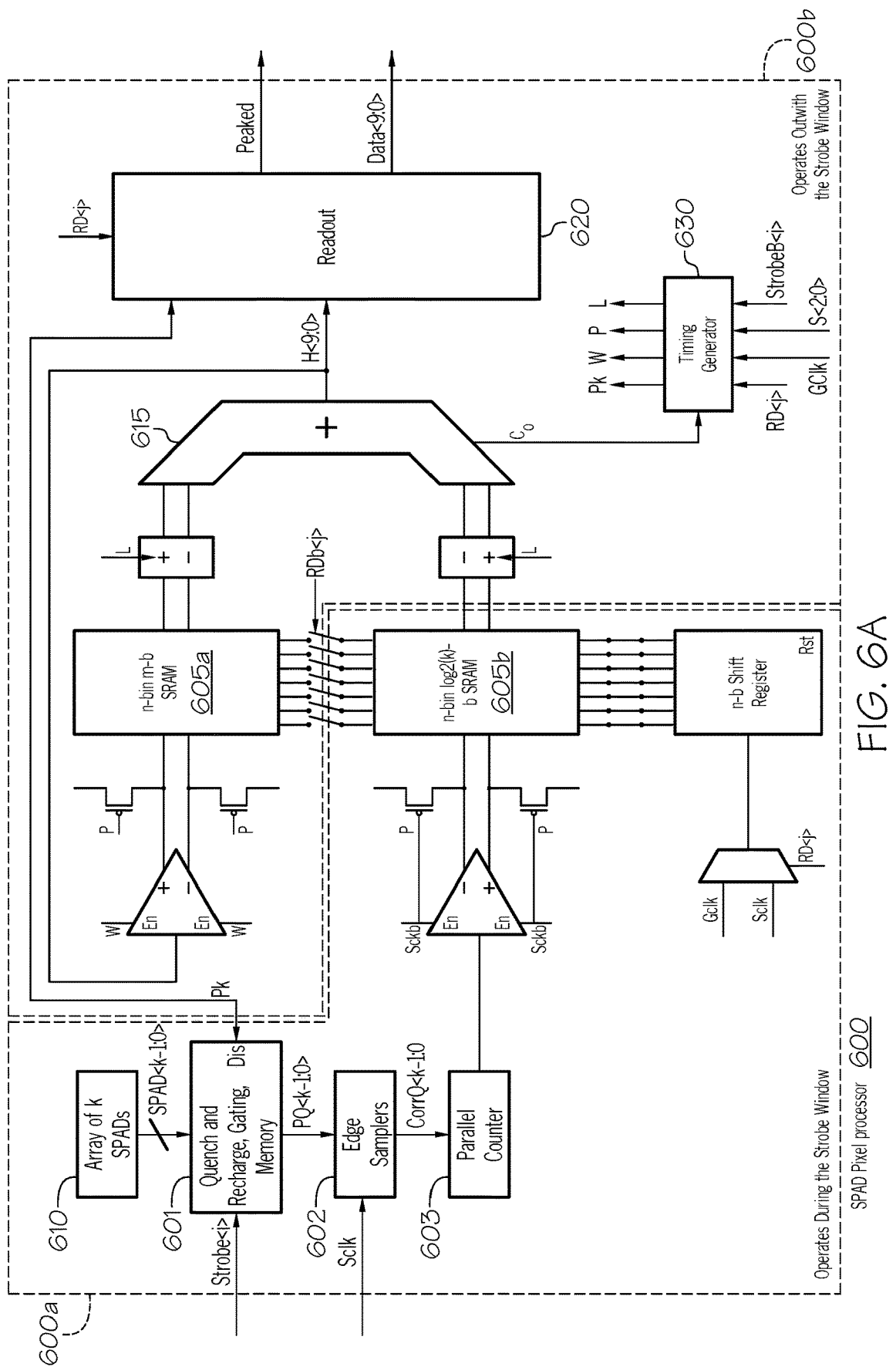
FIG. 6A is a schematic block diagram illustrating a pipelined histogramming pixel circuit in accordance with some embodiments of the present disclosure.

FIG. 6A illustrates a pipelined histogramming pixel in accordance with some embodiments of the present disclosure. In particular, FIG. 6A illustrates an example SPAD-based pixel processor circuit 600, which may be implemented by the processor 105' and/or the control circuit 105 described herein. The SPAD pixel processor circuit 600 receives inputs from k SPADs implemented in an array 610. The array 610 of k SPADs may define a detector pixel in some embodiments.

The SPAD pixel processor circuit 600 also implements circuits 601, 602, 603 that are configured to perform quench and recharge operations, timing or gating, edge sampling, and parallel counting. If a burst of multiple photons arrive substantially concurrently at a SPAD, it has the same effect as a single photon, namely, to discharge the SPAD. Once the SPAD has been discharged by the leading photon, it is blind to all the other photons in the burst (also referred to as "dead time") until quenched and recharged by the quench and recharge circuits. Active and/or passive quenching and/or recharge circuits for each single photon detector are also described, for example, in U.S. Patent Application Publication No. 2019/0250257.

In the example circuits illustrated herein, the SPADs are enabled by timing or gating circuits during a strobe window at the beginning of a laser cycle (that is, at a first strobe window of signal Strobe<i> immediately after the first pulse of Laser); however, it will be understood that similar operations may be performed for other strobe windows corresponding to different portions of the laser cycle. The illustrated strobe window of signal Strobe<i> may be repeated (e.g., for thousands of cycles of the signal Laser) to collect data for a sub-frame, before moving to the next sub-frame and strobe window (e.g., Strobe<i+1>). That is, each strobe window represented by the signal Strobe<i> represents a portion of the time between laser pulses or the signal Laser (and a corresponding distance subrange), and thousands of cycles of the signal Laser may be allocated to each strobe window of signal Strobe<i>. The SPAD pixel processor circuit includes first circuit elements 600a (e.g., 601, 602, 603, 605b) that operate during a first portion of the time between pulses of an emitter signal (i.e., during the strobe window), and second circuit elements 600b (e.g., 605a, 620, 630) that operate during a second portion of the time between the pulses of the emitter signal (i.e., during the time outwith or outside of the strobe window) to provide pipelined memory storage operations as described herein.

As shown in FIG. 6A, during a strobe window, example detection signals SPAD<k–1:0> are output from the detector array 610 responsive to detection of respective photons by the SPADs, and are provided to the quench and recharge circuit 601. In some embodiments, the quench and recharge circuit 601 may include active quench (AQ) circuits or (as shown) passive quench (PQ) circuits, which can reset the SPADs and output signals PQ<k–1:0> to the edge sampler circuits 602. The edge sampler circuits 602 sample the detection signals or representations thereof and output signals CorrQ<k–1:0> to the parallel counter 603. In the example of FIG. 6A, the sampling frequency of the edge sampler circuits 602 is provided by a clock signal Sclk, which provides sampling of the signal signals PQ<k–1:0> at a frequency corresponding to the number of bins n of the buffer memory 605b and/or main memory 605a. The parallel counter 603 outputs the counts of the sampled SPAD events S<log 2(k):0> and the counts are written to a temporary or buffer memory 605b (shown as n-bin, log 2(k)-bit SRAM) during the strobe window.

In some embodiments, the signals CorrQ<k–1:0> may represent correlated detection events that are output in response to incident photons that arrive within a predetermined or adjustable correlation window or correlation time. More particularly, the signals CorrQ<k–1:0> may represent the outputs of the edge sampler circuits 602 (in this example, SPAD samplers) which output a binary result; for example, a 1 if at least one photon was detected from the SPAD (at least one rising edge) in the last $T_{sample}$ period of the sampling clock signal Sclk, or a 0 if no photon was detected from the SPAD. These samples may be summed to determine the total activity of the k SPADs in the last sampling clock signal Sclk cycle, and this value is stored in the temporary memory buffer 605b (n-bin, log 2(k)-bit SRAM). This value stored in the temporary memory buffer 605b can then later (e.g., during the time outwith of the strobe window) be summed with the SRAM histogram value (e.g., by an adder circuit 615) to update the bin count in the main memory 605a under control of the integration clock signal Gclk, which may have a potentially lower clock period $T_{integrate}$.

Operations of some components of the SPAD pixel processor 600 of FIG. 6A are described with reference to the timing diagrams of FIGS. 7A1-7A2 and 7B1-7B2. In particular, FIGS. 7A1-7A2 and 7B1-7B2 are timing diagrams illustrating example operations of the pipelined histogramming pixel of FIG. 6A during respective portions of the time between emitter pulses.

As shown in FIG. 7A1-7A2, first memory storage operations 700a are executed (e.g., by the first circuit elements 600a) in a first phase (phase 1) during the strobe window. In the first phase, the SPAD events S<log 2(k):0> are obtained by sampling the detection signals output from the SPADs at a predetermined sampling rate (e.g., responsive to sampling clock signal Sclk having a period $T_{sample}$), and the photon counts indicated by the SPAD events are written to respective bins of a temporary or buffer memory 605b (e.g., a buffer SRAM) as data M<n−1:0>. The data M<n−1:0> stored in the buffer memory 605b may be erased, overwritten, or otherwise discarded by or at the next emitter signal pulse. The only memory storage operations performed during each clock cycle or period $T_{sample}$ may be write operations (W), allowing for shorter cycle time and higher temporal resolution bins, which may be completed during the strobe window.

As shown in FIG. 7B1-7B2, second memory storage operations 700b are executed (e.g., by the second circuit elements 600b) in a second phase (phase 2) during the time after the strobe window but before the next emitter pulse, in which the data M<n−1:0> stored in the bins of the temporary or buffer memory are read and summed with histogram data H<n−1:0> stored in the main memory to integrate the data M<n−1:0> with the histogram data H<n−1:0> (e.g., responsive to integration clock signal Gclk having a period $T_{integrate}$). The histogram data H<n−1:0> stored in the main memory 605a may be readout (by readout circuit 620) at predetermined times, for example, at the end of each subframe corresponding to a respective distance subrange (e.g., 0-10 m, 10-20 m, etc.) of the overall imaging distance range (e.g., 100 m) of the LIDAR detector. In some embodiments, a readout signal may be output responsive to a read signal that is sequentially applied to respective rows (or columns) of the main memory 605a, and may be used to calculate an estimated time of arrival of photons incident on the photodetector elements. For an SRAM-based main memory 605a (shown in FIG. 6A as n-bin, m-bit SRAM), the SRAM precharge-read-modify-write (PRMW) loop can thus be more easily completed within the (comparatively longer) time outwith or outside of the strobe window, which may also distribute power requirements (as power draw may be present during both the strobe window and thereafter).

In contrast, some prior implementations of SPAD pixel processing circuits are shown by way of example in FIGS. 6B1-6B3. In the example implementation of FIGS. 6B1-6B3, each of the pixels of the array 10 may count SPAD events S<log 2(k):0> and update the SRAM histogram H<n−1:0> stored in the memory 05 during the strobe window. The SRAM precharge-read-modify-write (PRWM) loop is accomplished within each $T_{sample}$ cycle, thereby limiting the cycle time. Moreover, no power draw may be present during the time outwith or outside of the strobe window. That is, in FIGS. 6B1-6B3, the circuit elements 01, 02, 03, 05, 10, 20, and 30 operate during the strobe window, but may be idle during a majority of the remaining time after the strobe window and before a next pulse of the pulses of the emitter signal (Laser).

Figure 8:
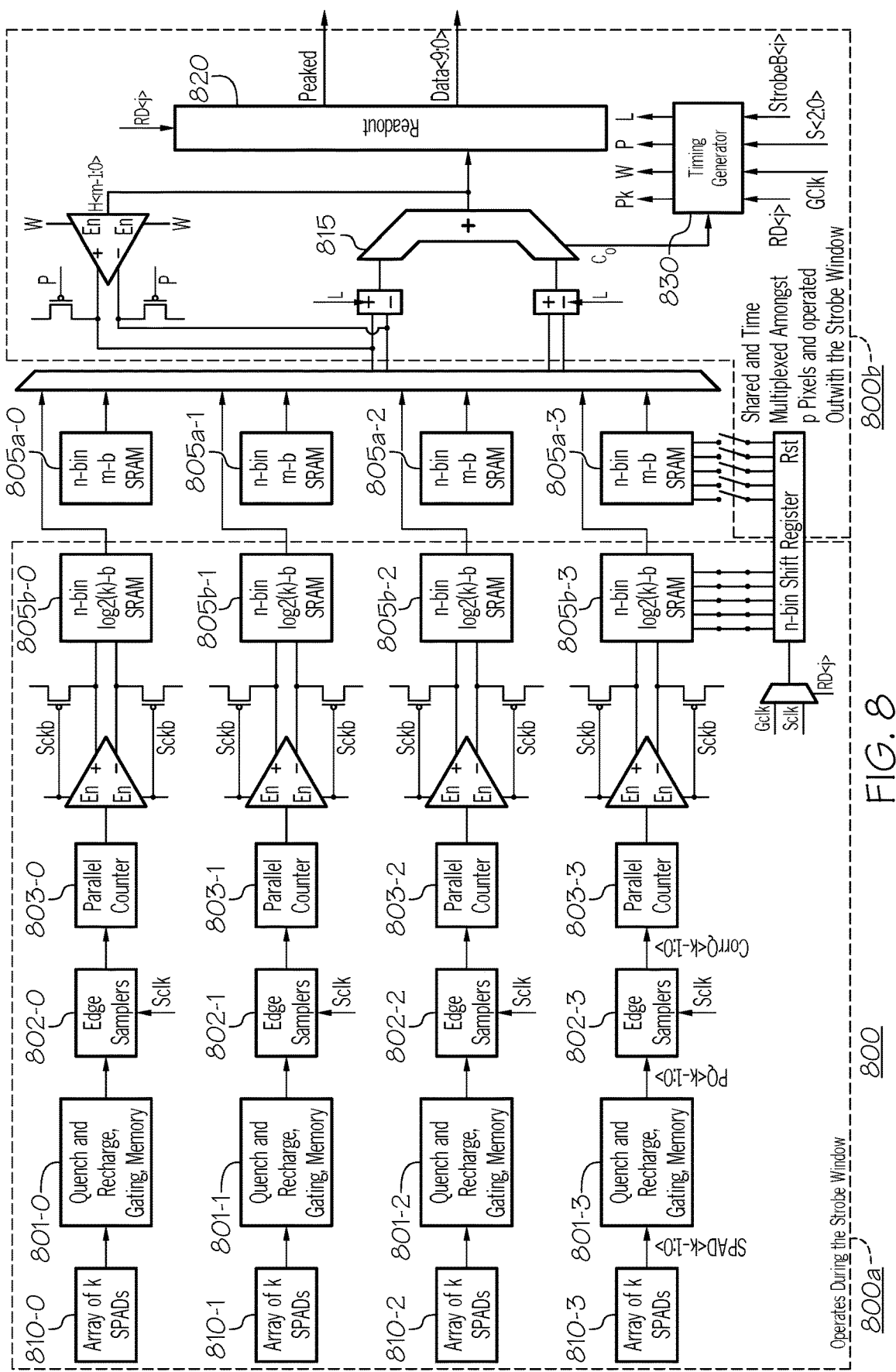
FIG. 8 is a schematic block diagram illustrating a shared pipelined histogramming pixel in accordance with some embodiments of the present disclosure.

FIG. 8 illustrates a shared pipelined histogramming pixel 800 in accordance with some embodiments of the present disclosure. The configuration of FIG. 8 illustrates first memory storage operations performed by first circuit elements 800a in parallel for four detector arrays 810-0 to 810-3 (collectively 810, with each including k SPADs) to write counts to respective buffer memory devices 805b-0 to 805b-3 (collectively 805b, shown as n-bin, log 2(k)-bit SRAM) during the strobe window, and second multiplexed memory storage operations performed by second circuit elements 800b serially or sequentially during respective portions of the time between emitter pulses outwith or outside of the strobe window to retrieve the data stored in the buffer memory devices 805b-0 to 805b-3 and integrate the data into the corresponding bins of the histogram data stored in the main memory devices 805a-0 to 805a-3 (collectively 805a, shown as n-bin, m-bit SRAM). The arrays of k SPADs 810 may each define a detector pixel in some embodiments.

Operations of some components of the SPAD pixel processor 800 of FIG. 8 will now be described with reference to the timing diagrams of FIGS. 9A1-9A2 and 9B1-9B2. In particular, FIGS. 9A1-9A2 and 9B1-9B2 are timing diagrams illustrating example operations of the shared pipelined histogramming pixel of FIG. 8 during respective portions (e.g., during the strobe window and outside of the strobe window) of the time between emitter pulses.

As shown in FIGS. 9A1-9A2, first memory storage operations 900a are executed (e.g., by the first circuit elements 800a, including elements 801, 802, 803, 805b, and 810) in a first phase (phase 1) during the strobe window. In the first phase, the SPAD events S<log 2(k):0> are obtained by sampling the detection signals output from the SPAD arrays 810 at a predetermined sampling rate (e.g., responsive to sampling clock signal Sclk having a period $T_{sample}$), and the photon counts indicated by the SPAD events are written to respective bins of a temporary or buffer memory 805b (e.g., a buffer SRAM) as data M<n−1:0>. Only write operations (W) may be performed during each clock cycle or period $T_{sample}$, allowing for shorter cycle time and higher temporal resolution bins, which may be completed during the strobe window. The operations of the shared controller configuration of FIGS. 9A1-9A2 are thus similar to those of FIGS. 7A1-7A2.

As shown in FIGS. 9B1-9B2, second memory storage operations 900b-0 to 900b-3 (each including operations 405) are executed (e.g., by the second circuit elements 800b, including elements 805a, 815, 820, 830; sequentially, for each array 810) in a second phase (phase 2) during the time after the strobe window but before the next emitter pulse. That is, the remaining portion of the time between emitter pulses is divided or time-multiplexed among the operations of the respective memory devices of multiple pixels (shown as Pixel #0 to Pixel #3).

In particular, in the second phase, responsive to integration clock signal Gclk having a period $T_{integrate}$, the data M0<n-1:0> stored in the n bins of the respective temporary or buffer memory devices 805b-0 of Pixel #0 are read and summed with histogram data H0<n-1:0> stored in the main memory devices 805a-0 of Pixel #0 to integrate the data M0<n-1:0> stored in the buffer memory 805b-0 with the histogram data H0<n-1:0> stored in the main memory 805a-0; then the data M1<n-1:0> stored in the n bins of the respective temporary or buffer memory devices 805b-1 of Pixel #1 are read and summed with histogram data H1<n-1:0> stored in the main memory devices 805a-1 of Pixel #1 to integrate the data M1<n-1:0> stored in the buffer memory 805b-1 with the histogram data H1<n-1:0> stored in the main memory 805a-1; then the data M2<n-1:0> stored in the n bins of the respective temporary or buffer memory devices 805b-2 of Pixel #2 are read and summed with histogram data H2<n-1:0> stored in the main memory devices 805a-2 of Pixel #2 to integrate the data M2<n-1:0> stored in the buffer memory 805b-2 with the histogram data H2<n-1:0> stored in the main memory 805a-2; and then the data M3<n-1:0> stored in the n bins of the respective temporary or buffer memory devices 805b-3 of Pixel #3 are read and summed with histogram data H3<n-1:0> stored in the main memory devices 805a-3 of Pixel #3 to integrate the data M3<n-1:0> stored in the buffer memory 805b-3 with the histogram data H3<n-1:0> stored in the main memory 805a-3. It will be understood, however, that the order of integrating the data stored in the buffer memory devices 805b into the data stored in the respective main memory devices 805a is not limited to the order in the example described above.

For an SRAM-based main memory, time multiplexing the ALU and SRAM PRMW hardware can thus economize area (i.e., device footprint or pixel area), allowing for more SRAM bins in the same area. Also, as the SRAM PRWM loop can be completed within the time outwith or outside of the strobe window, longer strobe windows (and thus better light collection efficiency) may be provided. For example, longer strobe windows can be provided due to sharing of the ALU and PRMW hardware, as the area saved can be used for more SRAM bits in each pixel, which allows for extending the duration of the strobe.

The table below illustrates the greater percentage of area available in the pixel for memory as a function of sharing ALU/PRMW hardware area as described herein. As summarized in Table 1, shared pipelined histogramming pixels in accordance with some embodiments of the present disclosure can provide improved pixel area utilization:

TABLE 1

| | Pixel Area (prior) | Pixel Area 4x Shared Pipelined |
|---|---|---|
| SRAM | A/(A + B + C) % | (4A + 3C)/(4A + 4B + 4C) % |
| Pixel FE and Sampler | B/(A + B + C) % | B/(A + B + C) % |
| SRAM PRMW | C/(A + B + C) % | C/(4 A + 4B + 4C) % |

In Table 1, "A" represents the area occupied by the SRAM memory device, "B" represents the area occupied by the pixel front end (FE) and sampler, and "C" represents the area occupied by the SRAM PRMW controller. In a conventional pixel, the total surface area occupied by the SRAM, pixel FE and sampler, and PRMW controller is A+B+C, and the total surface area of 4 pixels would be 4(A+B+C). However, in a 4-way shared pipelined configuration in accordance with embodiments described herein, the sharing of the controller among 4 pixels may increase the available surface area for the SRAM memory device within the same footprint as a conventional 4-pixel layout. For example, the available surface area of the SRAM device may be 4(A+B+C)−4B−C=4A+3C.

Table 2 illustrates tradeoffs between the number of bins and the PRMW cycle time:

TABLE 2

| Pixel Pitch | Process Node | Sharing p | Bin Number n | $T_{sample}$ | $T_{integrate}$ | #Strobes In 200 m |
|---|---|---|---|---|---|---|
| A | 65 nm | 1 | 18 | 4 ns | 4 ns | 20 |
| A | 65 nm | 4 | 54 | 2 ns | 3 ns | 13 |
| A | 65 nm | 4 | 108 | 1 ns | 3 ns | 13 |
| A | 65 nm | 2 | 72 | 2 ns | 8 ns | 10 |
| A | 40 nm | 1 | 48 | 2 ns | 2 ns | 14 |
| A | 40 nm | 4 | 108 | 2 ns | 2.5 ns | 7 |
| A | 40 nm | 2 | 170 | 1 ns | 3.5 ns | 8 |

Figure 10A:
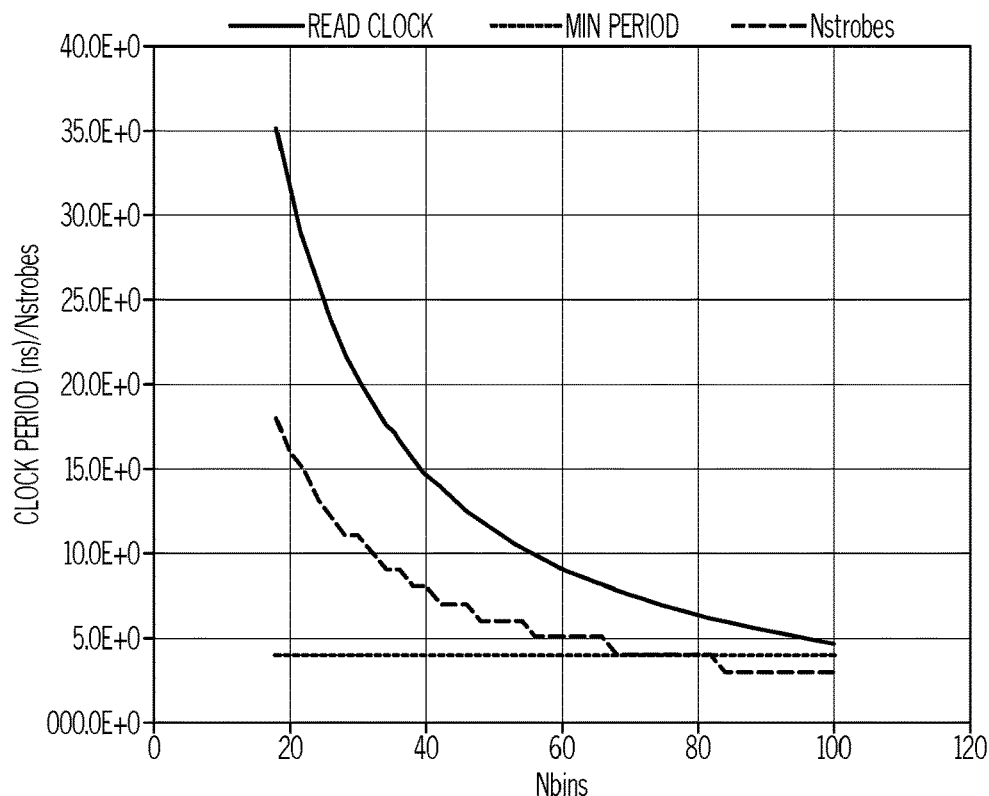
FIGS. 10A, 10B, 10C, and 10D are graphs illustrating various combinations of controller sharing, memory bins, and clock periods that may be achieved with shared pipelined configurations in accordance with some embodiments of the present disclosure.
Figure 10B:
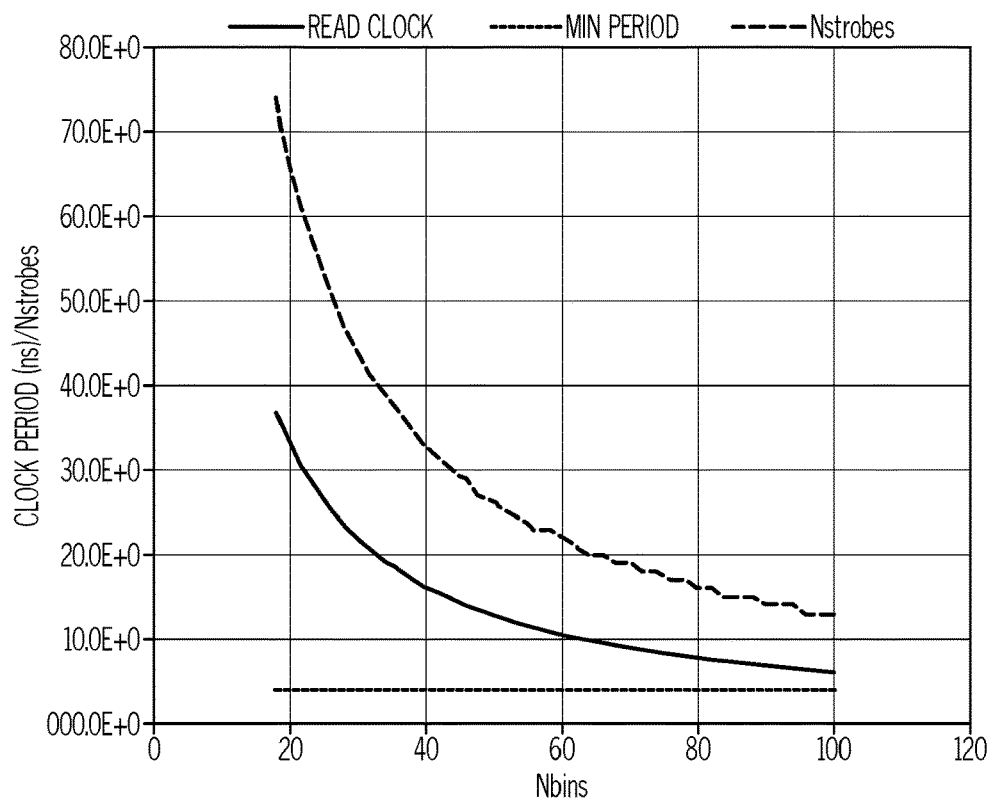
Figure 10C:
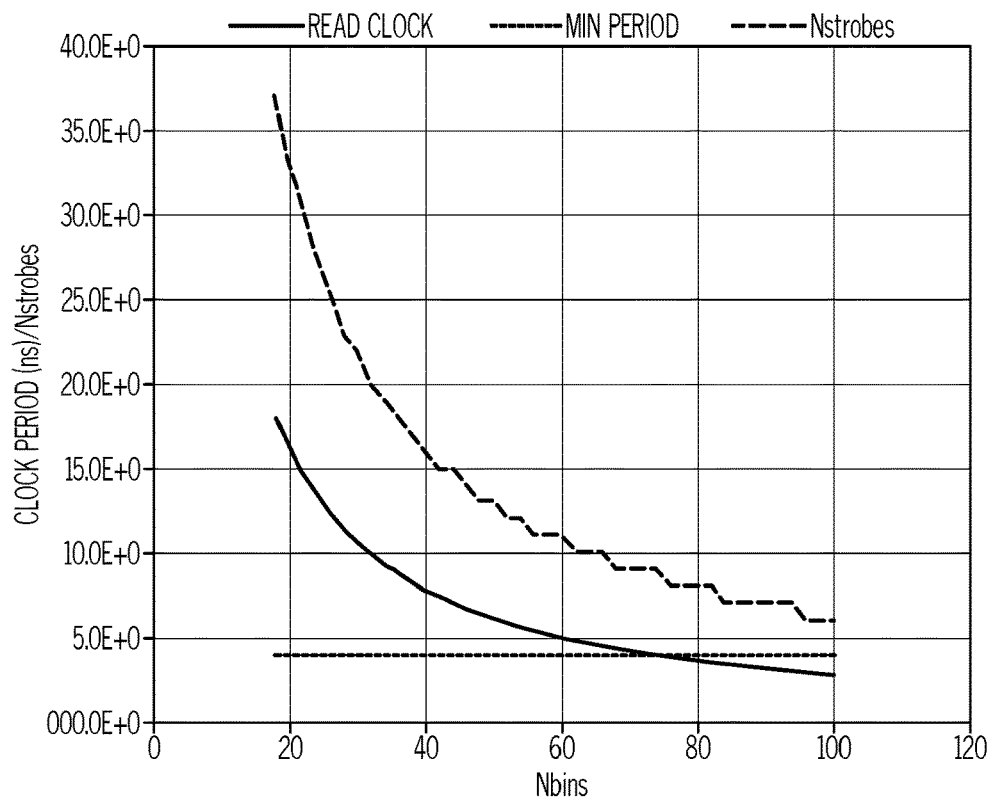
Figure 10D:
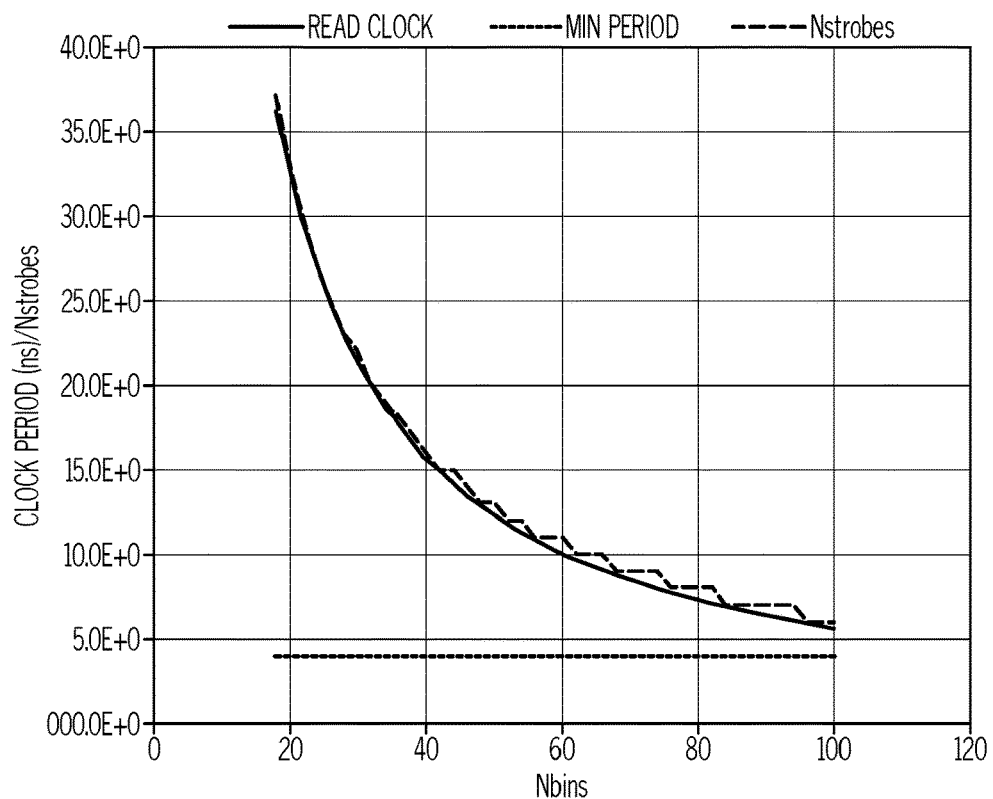

The graphs of FIGS. 10A to 10D illustrate various combinations of controller sharing, memory bins, and clock periods that may be achieved with shared pipelined configurations as described herein. In particular, FIG. 10A illustrates number of bins n vs. clock period in a two-way shared controller arrangement with 4 ns bins; FIG. 10B illustrates number of bins n vs. clock period in a two-way shared controller arrangement with 1 ns bins; FIG. 10C illustrates number of bins n vs. clock period in a four-way shared controller arrangement with 2 ns bins; and FIG. 10D illustrates number of bins n vs. clock period in a two-way shared controller arrangement with 2 ns bins.

Though the main and buffer memory devices are described herein with reference to SRAM by way of example, other types of memory devices may be used, both volatile and non-volatile, without deviating from the scope of the present invention. For example, the memory used for the SPAD pixels may be dynamic RAM (DRAM), which may be implemented with a refresh mechanism and refresh cycle to avoid loss of data due to leakage. Such refresh mechanisms are further described, for example in U.S. Provisional Patent Application No. 62/966,171 entitled "DRAM-Based LIDAR Pixel," the disclosure of which is incorporated by reference herein in its entirety. In some embodiments, the memory may be implemented as high bandwidth memory (HBM). In some embodiments, the memory may be implemented as resistive memory such as phase change RAM (PRAM), magnetic RAM (MRAM), and resistive RAM (RRAM). In addition, multiple variations of each type of memory may be supported. For example, with respect to SRAM, embodiments described herein may be implemented using 6T (six transistor) SRAM, 8T dual-port SRAM, single-ended 6T SRAM, and the like. More generally, the memory or memory devices described herein may be any tangible, non-transitory computer-readable storage medium, including electronic, magnetic, optical, electromagnetic, or semiconductor data storage systems, apparatus, or devices.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., filed Apr. 12, 2018, with the United States Patent and Trademark Office, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts.

The example embodiments may be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein The terminology used herein is for the purpose of describing particular embodiments only and is not intended to be limiting of example embodiments. As used herein, the singular forms "a," "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the present invention being set forth in the following claims.

The invention claimed is:

1. A Light Detection and Ranging (LIDAR) detector circuit, comprising:
  a non-transitory memory device comprising a first memory and a second memory; and
  at least one control circuit configured to execute first memory storage operations to store data indicated by detection signals received from one or more photodetector elements in the first memory during a first portion of a time between pulses of an emitter signal output from a LIDAR emitter element, and to execute second memory storage operations to include the data, which was stored in the first memory, in the second memory during a second portion of the time between the pulses of the emitter signal,
  wherein the first portion of the time comprises a strobe window of activation of the one or more photodetector elements, wherein the detection signals are output from the one or more photodetector elements in response to a plurality of photons incident thereon during the strobe window,
  wherein the second portion of the time comprises a remainder of the time between the pulses of the emitter signal, after the strobe window and before a next pulse of the pulses of the emitter signal, and
  wherein the first memory is a buffer memory device and the second memory is a main memory device, and wherein the at least one control circuit is further configured to execute the second memory storage operations to transfer the data from the buffer memory to be included in the main memory after the strobe window and before the next pulse of the emitter signal.

2. The LIDAR detector circuit of claim 1, wherein the at least one control circuit comprises a sampler circuit that is configured to execute the first memory storage operations, and wherein the first memory storage operations comprise sampling the data from the detection signals at a predetermined sampling rate and writing the data to respective bins of the first memory.

3. The LIDAR detector circuit of claim 2, wherein the at least one control circuit further comprises a memory controller that is configured to execute the second memory storage operations, and wherein the second memory storage operations comprise retrieving the data from the respective bins of the first memory and integrating the data into respective bins of the second memory, wherein the respective bins of the second memory comprise histogram data for an imaging distance subrange corresponding to the strobe window.

4. The LIDAR detector circuit of claim 3, wherein the memory controller and the second memory are inactive during the first portion of the time, and wherein the sampler circuit is inactive during the second portion of the time.

5. The LIDAR detector circuit of claim 4, wherein the second memory comprises static random access memory (SRAM) or a dynamic random access memory (DRAM), and wherein the second memory storage operations comprise precharge and read operations to retrieve the data from the respective bins of the first memory, and precharge, read, modify, and write operations to integrate the data into the respective bins of the second memory.

6. The LIDAR detector circuit of claim 1, further comprising:
a detector interface circuit coupled to the at least one control circuit and configured to receive the detection signals from the one or more photodetector elements during the first portion of the time, wherein the detector interface circuit is inactive during the second portion of the time.

7. The LIDAR detector circuit of claim 1, wherein:
the one or more photodetector elements comprise a subset of a plurality of photodetector elements, and respective subsets of the plurality of photodetector elements define respective detector pixels; and
the at least one control circuit comprises a shared control circuit that is configured to execute the first memory storage operations for the respective detector pixels during the first portion of the time, and is configured to execute the second memory storage operations for the respective detector pixels during the second portion of the time.

8. The LIDAR detector circuit of claim 7, wherein the second memory comprises respective main memory devices, and wherein the shared control circuit is configured to execute the second memory storage operations to store respective data for the respective detector pixels in the respective main memory devices sequentially during the second portion of the time.

9. The LIDAR detector circuit of claim 7, wherein the first memory comprises respective buffer memory devices, and wherein the shared control circuit is configured to execute the first memory storage operations to store respective data for the respective detector pixels in the respective buffer memory devices in parallel during the first portion of the time.

10. The LIDAR detector circuit of claim 1, wherein the at least one control circuit is configured to execute the first memory storage operations responsive to a first clock signal, and to execute the second memory storage operations responsive to a second clock signal different than the first clock signal.

11. The LIDAR detector circuit of claim 1, wherein the one or more photodetector elements comprise single-photon avalanche detectors (SPADs), and wherein the data comprises photon counts indicated by the detection signals corresponding to an imaging distance subrange defined by the strobe window.

12. A Light Detection and Ranging (LIDAR) detector circuit, comprising:
one or more photodetector elements defining a LIDAR detector pixel;
a buffer memory device;
a main memory device; and
at least one processor circuit configured to execute first and second memory storage operations to store data indicated by detection signals received from the LIDAR detector pixel in the buffer and main memory devices during first and second portions of a time between pulses of a LIDAR emitter signal, respectively,
wherein the first portion of the time comprises a strobe window of activation of the LIDAR detector pixel, and the second portion of the time comprises a remainder of the time between the pulses of the LIDAR emitter signal, after the strobe window and before a next pulse of the pulses of the LIDAR emitter signal, and
wherein data is transferred from the buffer memory to the main memory after a strobe window of activation of the one or more photodetector elements and before the next pulse of the emitter signal.

13. The LIDAR detector circuit of claim 12, wherein the at least one processor circuit comprises:
a sampler circuit that is configured to execute the first memory storage operations to sample the data from the detection signals at a predetermined sampling rate and write the data to respective bins of the buffer memory device; and
a memory controller that is configured to execute the second memory storage operations to retrieve the data from the respective bins of the buffer memory device and integrate the data in respective bins of the main memory device, wherein the respective bins of the main memory device comprise histogram data for an imaging distance subrange corresponding to the strobe window.

14. The LIDAR detector circuit of claim 13, wherein the memory controller and the main memory are inactive during the first portion of the time, and wherein the sampler circuit is inactive during the second portion of the time.

15. The LIDAR detector circuit of claim 14, wherein:
the one or more photodetector elements define a respective LIDAR detector pixel of a plurality of LIDAR detector pixels, each of the LIDAR detector pixels being associated with a respective buffer memory device and a respective main memory device; and
the at least one processor circuit comprises a shared control circuit that is configured to execute the first memory storage operations for each of the LIDAR detector pixels in parallel to store respective data indicated by detection signals received therefrom in the respective buffer memory device, and to execute the second memory storage operations for each of the LIDAR detector pixels sequentially to include the respective data in the respective main memory device.

16. The LIDAR detector circuit of claim 12, wherein the at least one processor circuit is configured to execute the first and second memory storage operations responsive to different first and second clock signals, respectively.

17. A method of operating a Light Detection and Ranging (LIDAR) detector circuit, the method comprising:
executing first memory storage operations to store data indicated by detection signals received from one or more photodetector elements in a first memory during a first portion of a time between pulses of an emitter signal output from a LIDAR emitter element; and executing second memory storage operations to include the data, which was stored in the first memory, in a second memory during a second portion of the time between the pulses of the emitter signal, wherein the first portion of the time comprises a strobe window of activation of the one or more photodetector elements, and wherein the detection signals are received from the one or more photodetector elements in response to a plurality of photons incident thereon during the strobe window, wherein the second portion of the time comprises a remainder of the time between the pulses of the emitter signal, after the strobe window and before a next pulse of the pulses of the emitter signal, and wherein data is transferred from the first memory to the second memory after a strobe window of activation of the one or more photodetector elements and before the next pulse of the emitter signal.

18. The method of claim 17, wherein:

the executing the first memory storage operations comprises sampling the data from the detection signals at a predetermined sampling rate and writing the data to respective bins of the first memory; and the executing the second memory storage operations comprise retrieving the data from the respective bins of the first memory and integrating the data in respective bins of the second memory, wherein the respective bins of the second memory comprise histogram data for an imaging distance subrange corresponding to the strobe window.

19. The method of claim 17, wherein the executing the first and second memory storage operations comprises:

executing the first memory storage operations responsive to a first clock signal; and executing the second memory storage operations responsive to a second clock signal different than the first clock signal.

20. A LIDAR system comprising the LIDAR detector circuit of claim 1, wherein the LIDAR system is configured to be coupled to an autonomous vehicle such that the LIDAR emitter element and the one or more photodetector elements are oriented relative to an intended direction of travel of the autonomous vehicle.

* * * * *